United States Patent
Bidari et al.

(10) Patent No.: US 11,748,739 B2
(45) Date of Patent: *Sep. 5, 2023

(54) WIRELESS COMMUNICATION SYSTEM WITH AUXILIARY ANTENNA

(71) Applicant: Block, Inc., San Francisco, CA (US)

(72) Inventors: Emad Bidari, Toronto (CA); Afshin Rezayee, Richmond Hill (CA)

(73) Assignee: Block, Inc., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/094,746

(22) Filed: Nov. 10, 2020

(65) Prior Publication Data

US 2021/0065159 A1 Mar. 4, 2021

Related U.S. Application Data

(63) Continuation of application No. 15/176,589, filed on Jun. 8, 2016, now Pat. No. 10,937,019.

(51) Int. Cl.
*G06Q 20/32* (2012.01)
*H04B 5/00* (2006.01)
*H04B 7/06* (2006.01)

(52) U.S. Cl.
CPC ....... *G06Q 20/3278* (2013.01); *H04B 5/0031* (2013.01); *H04B 5/0087* (2013.01); *H04B 7/0602* (2013.01)

(58) Field of Classification Search
CPC combination set(s) only.
See application file for complete search history.

(56) References Cited

U.S. PATENT DOCUMENTS

| | | | |
|---|---|---|---|
| 3,128,349 A | 4/1964 | Boesch et al. |
| 4,776,003 A | 10/1988 | Harris |
| 4,860,336 A | 8/1989 | D'Avello et al. |
| 5,221,838 A | 6/1993 | Gutman et al. |
| 5,351,296 A | 9/1994 | Sullivan |

(Continued)

FOREIGN PATENT DOCUMENTS

| | | | |
|---|---|---|---|
| AU | 2324402 A | 6/2002 |
| CN | 1630988 A | 6/2005 |

(Continued)

OTHER PUBLICATIONS

English Language Translation of Second Office Action received for Chinese Patent Application No. 201780035862, dated May 13, 2021.

(Continued)

*Primary Examiner* — Zhitong Chen
(74) *Attorney, Agent, or Firm* — Maynard Nexsen PC; Brian T. Sattizahn, Esq.

(57) ABSTRACT

A wireless communication device communicates with an inductively coupled device via a wireless carrier signal that may be modulated by both the wireless communication device and the inductively coupled device. The inductively coupled signal is transmitted from a transponder antenna of the wireless communication device. The wireless communication device also includes an auxiliary antenna. The auxiliary antenna is enabled while the wireless communication device is receiving a modulated version of the wireless carrier signal from the inductively coupled device.

20 Claims, 8 Drawing Sheets

(56) References Cited

U.S. PATENT DOCUMENTS

| | | |
|---|---|---|
| 5,388,155 A | 2/1995 | Smith |
| 5,408,513 A | 4/1995 | Busch, Jr. et al. |
| 5,714,741 A | 2/1998 | Pieterse et al. |
| 5,729,591 A | 3/1998 | Bailey |
| 5,740,232 A | 4/1998 | Pailles et al. |
| 5,838,773 A | 11/1998 | Eisner et al. |
| 5,850,599 A | 12/1998 | Seiderman |
| 5,867,795 A | 2/1999 | Novis et al. |
| 5,940,510 A | 8/1999 | Curry et al. |
| 6,010,067 A | 1/2000 | Elbaum |
| 6,098,881 A | 8/2000 | Deland, Jr. et al. |
| 6,144,336 A | 11/2000 | Preston et al. |
| 6,234,389 B1 | 5/2001 | Valliani et al. |
| 6,278,779 B1 | 8/2001 | Bryant et al. |
| 6,360,362 B1 | 3/2002 | Fichtner et al. |
| 6,481,623 B1 | 11/2002 | Grant et al. |
| 6,886,742 B2 | 5/2005 | Stoutenburg et al. |
| 6,990,683 B2 | 1/2006 | Itabashi |
| 7,003,316 B1 | 2/2006 | Elias et al. |
| 7,066,382 B2 | 6/2006 | Kaplan |
| 7,083,090 B2 | 8/2006 | Zuili |
| 7,163,148 B2 | 1/2007 | Durbin et al. |
| 7,210,627 B2 | 5/2007 | Morley et al. |
| 7,363,054 B2 | 4/2008 | Elias et al. |
| 7,424,732 B2 | 9/2008 | Matsumoto et al. |
| 7,433,452 B2 | 10/2008 | Taylor et al. |
| 7,591,425 B1 | 9/2009 | Zuili et al. |
| 7,673,799 B2 | 3/2010 | Hart et al. |
| 7,810,729 B2 | 10/2010 | Morley, Jr. |
| 7,896,248 B2 | 3/2011 | Morley, Jr. |
| 8,086,531 B2 | 12/2011 | Litster et al. |
| 8,126,734 B2 | 2/2012 | Dicks et al. |
| 8,265,553 B2 | 9/2012 | Cheon et al. |
| 8,397,988 B1 | 3/2013 | Zuili |
| 8,498,213 B2 | 7/2013 | Gnanasekaran et al. |
| 8,542,583 B2 | 9/2013 | Gnanasekaran et al. |
| 8,588,075 B2 | 11/2013 | Gnanasekaran et al. |
| 8,593,965 B2 | 11/2013 | Rongong et al. |
| 8,599,691 B2 | 12/2013 | Gnanasekaran et al. |
| 8,767,561 B2 | 7/2014 | Gnanasekaran et al. |
| 8,792,354 B2 | 7/2014 | Gnanasekaran et al. |
| 8,797,877 B1 | 8/2014 | Perla et al. |
| 9,020,853 B2 | 4/2015 | Hoffman et al. |
| 9,264,889 B2 | 2/2016 | Choi-Grogan et al. |
| 9,268,555 B2 | 2/2016 | Djabarov et al. |
| 9,411,574 B2 | 8/2016 | Kostadinov et al. |
| 9,489,496 B2 | 11/2016 | Wysocki et al. |
| 9,543,653 B2 | 1/2017 | Han et al. |
| 9,608,909 B1 | 3/2017 | Bharadwaj et al. |
| 9,672,028 B1 | 6/2017 | Vopni et al. |
| 9,679,286 B2 | 6/2017 | Colnot et al. |
| 9,830,141 B2 | 11/2017 | Cairns et al. |
| 9,916,737 B2 | 3/2018 | Osmon et al. |
| 9,934,014 B2 | 4/2018 | Diebolt et al. |
| 10,050,347 B2 | 8/2018 | Wei |
| 10,572,695 B1 | 2/2020 | Guise et al. |
| 10,579,989 B1 | 3/2020 | Binder et al. |
| 10,635,820 B1 | 4/2020 | Gallinghouse et al. |
| 2002/0091633 A1 | 7/2002 | Proctor |
| 2002/0153414 A1 | 10/2002 | Stoutenburg et al. |
| 2003/0076263 A1 | 4/2003 | Hassan-Zade et al. |
| 2003/0135418 A1 | 7/2003 | Shekhar et al. |
| 2003/0154414 A1 | 8/2003 | von Mueller et al. |
| 2003/0183691 A1 | 10/2003 | Lahteenmaki et al. |
| 2004/0012875 A1 | 1/2004 | Wood |
| 2004/0041911 A1 | 3/2004 | Odagiri et al. |
| 2004/0059682 A1 | 3/2004 | Hasumi et al. |
| 2004/0159699 A1 | 8/2004 | Nelson et al. |
| 2004/0167820 A1 | 8/2004 | Melick et al. |
| 2004/0204082 A1 | 10/2004 | Abeyta |
| 2005/0097015 A1 | 5/2005 | Wilkes et al. |
| 2005/0108444 A1 | 5/2005 | Flauaus et al. |
| 2005/0109841 A1 | 5/2005 | Ryan et al. |
| 2005/0236480 A1 | 10/2005 | Vrotsos et al. |
| 2006/0032905 A1 | 2/2006 | Bear et al. |
| 2006/0049255 A1 | 3/2006 | von Mueller et al. |
| 2006/0190611 A1 | 8/2006 | Miyazaki et al. |
| 2006/0223580 A1 | 10/2006 | Antonio et al. |
| 2007/0051809 A1* | 3/2007 | Takahashi .......... G06K 7/10326 235/451 |
| 2007/0067833 A1 | 3/2007 | Colnot |
| 2007/0121507 A1 | 5/2007 | Manzalini et al. |
| 2007/0168300 A1 | 7/2007 | Quesselaire et al. |
| 2007/0194104 A1 | 8/2007 | Fukuda et al. |
| 2007/0198436 A1 | 8/2007 | Weiss |
| 2008/0091617 A1 | 4/2008 | Hazel et al. |
| 2008/0204195 A1* | 8/2008 | Diorio ................ H04L 63/0492 340/10.1 |
| 2009/0070583 A1 | 3/2009 | von Mueller et al. |
| 2009/0112768 A1 | 4/2009 | Hammad et al. |
| 2009/0164326 A1 | 6/2009 | Bishop et al. |
| 2010/0057620 A1 | 3/2010 | Li et al. |
| 2010/0243732 A1 | 9/2010 | Wallner |
| 2011/0078435 A1 | 3/2011 | Krieger et al. |
| 2011/0110232 A1 | 5/2011 | Abraham et al. |
| 2011/0110381 A1 | 5/2011 | Atkinson et al. |
| 2012/0094599 A1* | 4/2012 | Takeyama ............ H04B 5/0031 455/41.1 |
| 2012/0257523 A1 | 10/2012 | Kasturi et al. |
| 2013/0249740 A1 | 9/2013 | Shedletsky |
| 2013/0260680 A1 | 10/2013 | Tsai |
| 2013/0300453 A1 | 11/2013 | Carapelli et al. |
| 2013/0309966 A1 | 11/2013 | Aldana et al. |
| 2013/0343186 A1 | 12/2013 | Gnanasekaran et al. |
| 2014/0056147 A1 | 2/2014 | Gnanasekaran et al. |
| 2014/0086054 A1 | 3/2014 | Rongong et al. |
| 2014/0148095 A1 | 5/2014 | Smith et al. |
| 2014/0150056 A1 | 5/2014 | Williams et al. |
| 2014/0173579 A1 | 6/2014 | McDonald |
| 2014/0208786 A1 | 7/2014 | Billman et al. |
| 2014/0273830 A1 | 9/2014 | Wong et al. |
| 2014/0317614 A1 | 10/2014 | Djabarov et al. |
| 2014/0375481 A1 | 12/2014 | McNicoll |
| 2015/0048163 A1 | 2/2015 | Senior |
| 2015/0052512 A1 | 2/2015 | Kostadinov et al. |
| 2015/0077361 A1 | 3/2015 | Seo et al. |
| 2015/0178064 A1 | 6/2015 | Cairns et al. |
| 2015/0235204 A1 | 8/2015 | Wallner |
| 2015/0303994 A1 | 10/2015 | Dhayni |
| 2015/0339649 A1 | 11/2015 | Pi Farias |
| 2016/0006123 A1 | 1/2016 | Li et al. |
| 2016/0028157 A1 | 1/2016 | Kim et al. |
| 2016/0054989 A1 | 2/2016 | Diebolt et al. |
| 2016/0079802 A1 | 3/2016 | Choi et al. |
| 2016/0111770 A1 | 4/2016 | Choi et al. |
| 2016/0182127 A1 | 6/2016 | Karandikar et al. |
| 2016/0218432 A1 | 7/2016 | Pope et al. |
| 2016/0275478 A1 | 9/2016 | Li et al. |
| 2016/0306616 A1 | 10/2016 | Tomppo |
| 2016/0308587 A1 | 10/2016 | Lee et al. |
| 2016/0323428 A1 | 11/2016 | Kim et al. |
| 2017/0323537 A1 | 11/2017 | Lim et al. |
| 2017/0357961 A1 | 12/2017 | Bidari et al. |
| 2018/0005224 A1 | 1/2018 | Binder et al. |
| 2018/0063004 A1 | 3/2018 | Uppunda et al. |
| 2018/0068300 A1 | 3/2018 | Saeed et al. |
| 2018/0198190 A1 | 7/2018 | Leem |
| 2019/0004785 A1 | 1/2019 | Kelley et al. |
| 2021/0255848 A1 | 8/2021 | Kelley et al. |

FOREIGN PATENT DOCUMENTS

| | | |
|---|---|---|
| CN | 1928885 A | 3/2007 |
| CN | 102468872 A | 5/2012 |
| CN | 202261429 U | 5/2012 |
| CN | 102709686 A | 10/2012 |
| CN | 103905073 A | 7/2014 |
| CN | 204009927 U | 12/2014 |
| CN | 105075143 A | 11/2015 |
| CN | 109314545 A | 2/2019 |
| CN | 109644021 A | 4/2019 |
| DE | 20320080 U1 | 4/2004 |
| EP | 0 895 203 A2 | 2/1999 |
| EP | 1260947 A1 | 11/2002 |

(56) References Cited

FOREIGN PATENT DOCUMENTS

| | | |
|---|---|---|
| EP | 1 874 014 A2 | 1/2008 |
| EP | 2736178 A1 | 5/2014 |
| FR | 2 812 744 A1 | 2/2002 |
| FR | 2 812 745 A1 | 2/2002 |
| FR | 2 834 156 A1 | 6/2003 |
| JP | H09231285 A | 9/1997 |
| JP | 2000-030146 A | 1/2000 |
| JP | 2000-276539 A | 10/2000 |
| JP | 2001-222595 A | 8/2001 |
| JP | 2002-074507 A | 3/2002 |
| JP | 2002-123771 A | 4/2002 |
| JP | 2002-279320 A | 9/2002 |
| JP | 2002-352166 A | 12/2002 |
| JP | 2002-358285 A | 12/2002 |
| JP | 2003-108777 A | 4/2003 |
| JP | 2003-281453 A | 10/2003 |
| JP | 2003-308438 A | 10/2003 |
| JP | 2004-054651 A | 2/2004 |
| JP | 2004-062733 A | 2/2004 |
| JP | 2004-078553 A | 3/2004 |
| JP | 2004-078662 A | 3/2004 |
| JP | 2004-199405 A | 7/2004 |
| JP | 4248820 B2 | 4/2009 |
| KR | 10-1999-0066397 A | 8/1999 |
| KR | 10-1999-0068618 A | 9/1999 |
| KR | 200225019 B1 | 3/2001 |
| KR | 10-2003-0005936 A | 1/2003 |
| KR | 10-2003-0005984 A | 1/2003 |
| KR | 10-2003-0012910 A | 2/2003 |
| KR | 200333809 B1 | 11/2003 |
| KR | 10-2004-0016548 A | 2/2004 |
| KR | 100447431 B1 | 8/2004 |
| KR | 200405877 B1 | 1/2006 |
| KR | 100649151 B1 | 11/2006 |
| KR | 10-2007-0107990 A | 11/2007 |
| KR | 100842484 B1 | 6/2008 |
| RU | 2284578 C1 | 9/2006 |
| TW | 201105089 A | 2/2011 |
| WO | 1998/012674 A2 | 3/1998 |
| WO | 2000/011624 A1 | 3/2000 |
| WO | 2000/025277 A1 | 5/2000 |
| WO | 2001/086599 A2 | 11/2001 |
| WO | 2002/033669 A1 | 4/2002 |
| WO | 2002/043020 A2 | 5/2002 |
| WO | 2002/082388 A1 | 10/2002 |
| WO | 2002/084548 A1 | 10/2002 |
| WO | 2003/044710 A1 | 5/2003 |
| WO | 2003/079259 A1 | 9/2003 |
| WO | 2004/023366 A1 | 3/2004 |
| WO | 2006/131708 A1 | 12/2006 |
| WO | 2017/214349 A1 | 12/2017 |
| WO | 2018/005468 A1 | 1/2018 |
| WO | 2019/005386 A1 | 1/2019 |

OTHER PUBLICATIONS

Office Action received for Chinese Patent Application No. 201780040833.2, dated Dec. 22, 2020.
Brinkmann, M., "Windows 10 Update Delivery Optimization explained," Windows, dated Aug. 17, 2016, Retrieved from the Internet URL: https://web.archive.org/web/20161110094241/https://www.ghacks.net/2016/08/17/windows-10-update-delivery-optimization/, pp. 1-6.
"Connection of Terminal Equipment to the Telephone Network," FCC 47 CFR Part 68, Retrieved from the URL: http://www.tscm.com/FCC47CFRpart68.pdf, on Sep. 24, 2019 Oct. 1, 1999 Edition.
"Embedded Financial transactional IC card Reader," Retrieved from the URL: https://cordis.europa.eu/project/rcn/58338/factsheet/en.
"FLEX-M24LR04E 45 mm x 75 mm flexible antenna reference board for the M24LR04E-R Dual Interface EEPROM," St Microelectronics, published Jul. 2, 2012, Retrieved from the Internet URL : http://www.st.com/content/ccc/resource/technical/document/data_brief/2d/55/62/05/58/fd/42/e2/DM00058583.pdf/files/DM00058583.pdf/jcr:content/translations/en.DM00058583.pdf, on Sep. 26, 2017, pp. 1-3.
Seethapriya Venkataramani and Srividya Gopalan., "Mobile phone based RFID architecture for secure electronic payments using RFID credit cards," 2007 IEEE, (ARES'07).
"Guideline for the Use of Advanced Authentication Technology," FIPS 190, Sep. 28, 1994.
"Identification cards—Recording technique—Part 4—Location of read-only magnetic tracks—Track 1 and 2," ISO/IEC 7811-4:1995, International Organization for Standardization, Aug. 1995.
Jerome Svigals., "The Long Life and Imminent Death of the Mag-stripe Card," IEEE Spectrum, vol. 49, Issue 61, Jun. 2012.
"Magensa's Decryption Services and MagTek's MagneSafe™ Bluetooth Readers Selected by eProcessing Network to Implement Secure Customer Card Data with Mobile Devices," Retrieved from the URL: https://www.magnensa.net/aboutus/articles/eProcessing-rev1.pdf Apr. 14, 2008.
Office Action received for European Patent Application No. 17739748. 6, dated May 10, 2021.
Notice to Grant received for Chinese Patent Application No. 201780040833.2, dated May 20, 2021.
Office Action received for Chinese Patent Application No. 201780035862, dated Dec. 2, 2020.
Martha E. Haykin et al., "Smart Card Technology: New Methods for Computer Access Control," NIST Special Publication 500-157, Sep. 1988.
"MSP430x1xx Family User's Guide," (including 2016 correction sheet at 2), Texas Instruments Inc., 2006.
Negron, J., "[Technical Blueprint] Windows 10 Co-Management with SCCM & Workspace ONE," VMware End-User Computing Blog, dated Apr. 16, 2018, Retrieved from the Internet URL: http://aponewsletter.blogspot.com/2018/04/technical-blueprint-windows-10-co.html, pp. 1-9.
Spegele, Joseph Brain , "A Framework for Evaluating Application of Smart Cards and Related Technology Within the Department of Defense," Naval Postgraduate School, Jan. 1995.
Stephen A. Sherman et al., "Secure Network Access Using Multiple Applications of AT&T's Smart Card," AT&T Technical Journal, Sep./Oct. 1994.
"Software Update Server," Technology Brief, Retrieved from the Internet URL: https://www.apple.com/server/docs/Software_Update_Server_TB_v10.4.pdf, pp. 1-3 (Jun. 16, 2005).
Huth C. et al., "Secure Software Update and IP Protection for Untrusted Devices in the Internet of Things Via Physically Unclonable Functions", The First IEEE International Workshop on Security, (2016), pp. 1-6.
Gupta H. et al., "Onboarding and Software Update Architecture for IoT Devices", IEEE, (2019), pp. 1-11.
Non-Final Office Action dated Mar. 29, 2018, for U.S. Appl. No. 15/428,071, of Uppunda, K.K.K., et al., filed Aug. 26, 2016.
Non-Final Office Action dated Apr. 19, 2018, for U.S. Appl. No. 15/176,589, of Bidari, E., et al., filed Jun. 8, 2016.
Non-Final Office Action dated Jul. 25, 2018, for U.S. Appl. No. 15/636,356, of Kelley, J., et al., filed Jun. 28, 2017.
Final Office Action dated Oct. 25, 2018, for U.S. Appl. No. 15/176,589, of of Bidari, E., et al., filed Jun. 8, 2016.
Final Office Action dated Nov. 5, 2018, for U.S. Appl. No. 15/428,071, of Uppunda, K.K.K., et al., filed Aug. 26, 2016.
Final Office Action dated Jan. 4, 2019, for U.S. Appl. No. 15/636,356, of Kelley, J., et al., filed Jun. 28, 2017.
Final Office Action dated Sep. 2, 2020, for U.S. Appl. No. 15/636,356, of Kelley, J., et al., filed Jun. 28, 2017.
Advisory Action dated Jan. 7, 2019, for U.S. Appl. No. 15/176,589, of Bidari, E., et al., filed Jun. 8, 2016.
Notice of Allowance dated Jan. 18, 2019, for U.S. Appl. No. 15/197,720, of Binder, J., et al., filed Jun. 29, 2016.
Non-Final Office Action dated Mar. 14, 2019 for U.S. Appl. No. 15/636,356, of Kelley, J. filed Jun. 28, 2017.
Non-Final Office Action dated Mar. 25, 2019, for U.S. Appl. No. 15/428,071, of Uppunda, K.K.K., et al., filed Aug. 26, 2016.
Non-Final Office Action dated Apr. 19, 2019, for U.S. Appl. No. 15/428,071, of Guise M., et al., filed Feb. 8, 2017.

(56) References Cited

OTHER PUBLICATIONS

Non-Final Office Action dated Jun. 24, 2019, for U.S. Appl. No. 16/397,836, of Binder, J., et al., filed Apr. 29, 2019.
Non-Final Office Action dated Jun. 25, 2019, for U.S. Appl. No. 15/721,663, of Gallinghouse, D., et al., filed Sep. 29, 2017.
Non-Final Office Action dated Jun. 28, 2019, for U.S. Appl. No. 15/176,589, of Bidari, E., et al., filed Jun. 8, 2016.
Non-Final Office Action dated Jul. 15, 2019, for U.S. Appl. No. 15/636,356, of Kelley, J., et al., filed Jun. 28, 2017.
Notice of Allowance dated Oct. 22, 2019, for U.S. Appl. No. 15/428,071, of Guise M., et al., filed Feb. 8, 2017.
Notice of Allowance dated Oct. 10, 2019, for U.S. Appl. No. 16/397,836, of Binder, J., et al., filed Apr. 29, 2019.
Notice of Allowance dated Nov. 6, 2019, for U.S. Appl. No. 15/176,589, of Bidari, E., et al., filed Jun. 8, 2016.
Notice of Allowance dated Dec. 23, 2019, for U.S. Appl. No. 15/721,663, of Gallinghouse, D., et al., filed Sep. 29, 2017.
Final Office Action dated Jan. 3, 2020, for U.S. Appl. No. 15/636,356, of Kelley, J., et al., filed Jun. 28, 2017.
Advisory Action dated Mar. 16, 2020, for U.S. Appl. No. 15/636,356, of Kelley, J., et al., filed Jun. 28, 2017.
Non-Final Office Action dated Mar. 16, 2020, for U.S. Appl. No. 15/176,589, of Bidari, E., et al., filed Jun. 8, 2016.
Non-Final Office Action dated May 8, 2020, for U.S. Appl. No. 15/636,356, of Kelley, J., et al., filed Jun. 28, 2017.
Examination Report, For European Patent Application No. 17739748.6, dated Jan. 16, 2020.
Intention to Grant received for European Patent Application No. 17737959.1, dated Jul. 4, 2019.
Intention to Grant received for European Patent Application No. 17737959.1, dated Nov. 6, 2019.
Decision to Grant received for European Patent Application No. 17737959.1, dated Nov. 21, 2019.
Office Action received for European Patent Application No. 17739748.6, dated Jul. 7, 2020.
Notice of Allowance dated Jul. 31, 2020, for U.S. Appl. No. 15/176,589, of Bidari, E., et al., filed Jun. 8, 2016.
Corrected Notice of Allowability dated Aug. 28, 2020, for U.S. Appl. No. 15/176,589, of Bidari, E., et al., filed Jun. 8, 2016.
Notice of Allowance dated Oct. 20, 2020, for U.S. Appl. No. 15/176,589, of Bidari, E., et al., filed Jun. 8, 2016.
Notice of Allowance dated Nov. 16, 2020, for U.S. Appl. No. 15/636,356, of Kelley, J., et al., filed Jun. 28, 2017.
Corrected Notice of Allowability dated Dec. 2, 2020, for U.S. Appl. No. 15/176,589, of Bidari, E., at al., filed Jun. 8, 2016.
International Search Report and Written Opinion for International Application No. PCT/US2016/050036, dated Nov. 29, 2016.
International Search Report and Written Opinion for International Application No. PCT/US2017/039466, dated Oct. 5, 2017.
International Search Report and Written Opinion for International Application No. PCT/US2017/036473, dated Oct. 13, 2017.
International Search Report and Written Opinion for International Application No. PCT/US2018/034773, dated Aug. 10, 2018.

* cited by examiner

WIRELESS COMMUNICATION SYSTEM WITH AUXILIARY ANTENNA

CROSS REFERENCE TO RELATED APPLICATION

This application is a continuation of U.S. patent application No. 15/176,589 filed on Jun. 8, 2016, entitled "WIRELESS COMMUNICATION SYSTEM WITH AUXILIARY ANTENNA," and granted as U.S. Pat. No. 10,937,019, which application is incorporated herein by reference.

BACKGROUND

Near field communication ("NFC") devices are capable of communicating when they are placed in close proximity to each other, and may be used for transactions such as payment transactions. Each of the NFC communication devices includes an antenna and related circuitry such as a matching circuit. A first NFC communication device generates a wireless carrier signal at a suitable frequency such as 13.56 MHz and transmits that signal over its antenna. When the antenna of a second NFC communication device is placed in close proximity to the antenna of the first NFC communication device, the two devices become inductively coupled, such that energy is coupled between the two devices through a shared magnetic field.

When the two NFC communication devices are inductively coupled, either of the NFC communication devices may communicate via modulated versions of the wireless carrier signal. The first NFC communication device may modify aspects of the wireless carrier signal such as amplitude, frequency, and phase prior to transmission in order to encode data that is transmitted to the second NFC communication device. During times that the first device is not transmitting, the second NFC communication device may encode data that is transmitted to the first NFC communication device. The second NFC communication device modifies the inductively coupled signal using techniques such as active or passive load modulation. The first NFC communication device receives the encoded data based on the changes to the inductively coupled signal.

Although NFC devices generally operate in close proximity, the relative strength and other characteristics of the inductively coupled signal depend on the relative distance and position between devices, as well as materials and configurations of physical packaging of the NFC communication devices. In some instances, weak signals or even dead spots may occur at particular relative distances and/or positions, or based on device types. This may result in a weak inductively coupled signal, high amounts of noise that decrease the signal-to-noise characteristics of modulated signals, and other undesirable characteristics that result in communication errors and difficulties.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
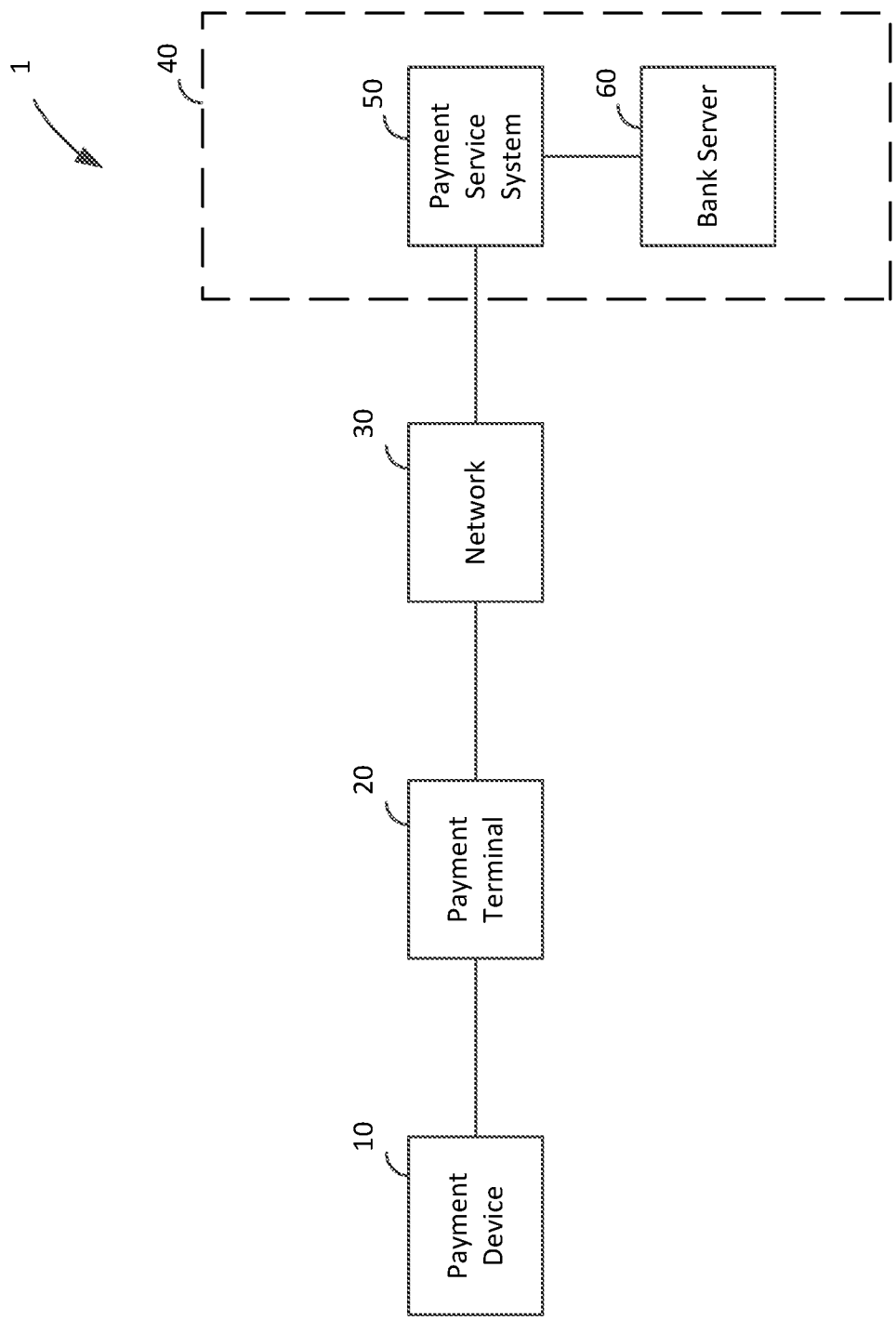
FIG. 1 shows an illustrative block diagram of a payment system in accordance with some embodiments of the present disclosure.

A payment system may include a payment terminal and a payment server. The payment terminal receives payment information from a payment device such as an EMV chip card, a magnetic stripe card, or a NFC payment device. The payment terminal provides a user interface for a merchant and communicates with the payment device and the payment server to process payment transactions. The payment server processes transactions based on the payment information as well as other information (e.g., payment amount, merchant, location, etc.) received from the payment terminal, and communicates a payment result (e.g., approval or denial) back to the payment terminal.

The payment terminal may have a variety of components for wirelessly communicating payment information with a payment device, such as a near field communications (NFC) system for radio frequency (RF) communications and a card slot with physical and electrical connectivity. The payment terminal may have a transponder antenna for transmitting a RF signal to allow the payment terminal to communicate data wirelessly with a payment device based on a wireless carrier signal transmitted by the payment terminal and inductively coupled with the payment device. In order to transmit data from the payment terminal to the payment reader, the payment terminal may modulate the wireless carrier signal and transmit the modulated wireless signal via the transponder antenna.

The payment device may communicate with the payment terminal by modulating the inductively coupled wireless carrier signal (e.g., while the payment terminal is not modulating the wireless carrier signal). During times that the payment terminal is not modulating the wireless carrier signal, it may utilize an auxiliary antenna that creates additional inductive coupling with the transponder antenna and the antenna of the payment device. In an embodiment, an auxiliary control circuit may selectively enable or disable the auxiliary antenna (e.g., based on whether the payment terminal is transmitting or receiving data). A control signal may be provided to a control input of a switching circuit, which may selectively open or close a circuit including the auxiliary antenna and other associated circuitry (e.g., an auxiliary load circuit coupled to the auxiliary antenna). The modulated signal from the payment device is received by the payment terminal based on changes to the inductively coupled signal, which is coupled to receive circuitry for processing.

The payment terminal may have a processing element coupled to the transmit circuit, receive circuit, and control input that is configured to execute various instructions for allowing the payment reader to communicate wirelessly with a payment device. The processing element may access transmit control instructions, receive control instructions, and receive measurement instructions stored in memory. During transmit events, the transmit control instructions may cause the processing element to provide the modulated wireless signal to the transmit circuit and to provide the disabling signal to the control input. During receive events, the receive control instructions may cause the processing element to provide the wireless carrier signal to the transmit circuit and the enabling signal to the control input. The receive measurement instructions may cause the processing element to demodulate the received signal during receive events. An inductively coupled load that is represented by the received signal during receive events may be based on the auxiliary antenna and the payment device.

FIG. 1 depicts an illustrative block diagram of a payment system 1 in accordance with some embodiments of the present disclosure. In one embodiment, payment system 1 includes a payment device 10, payment terminal 20, network 30, and payment server 40. In an exemplary embodiment, payment server 40 may include a plurality of servers operated by different entities, such as a payment service system 50 and a bank server 60. These components of payment system 1 facilitate electronic payment transactions between a merchant and a customer.

The electronic interactions between the merchant and the customer take place between the customer's payment device 10 and the merchant's payment terminal 20. The customer has a payment device 10 such as a credit card having magnetic stripe, a credit card having an EMV chip, or a NFC-enabled electronic device such as a smart phone running a payment application. The merchant has a payment terminal 20 such as a payment terminal or other electronic device that is capable of processing payment information (e.g., encrypted payment card data and user authentication data) and transaction information (e.g., purchase amount and point-of-purchase information), such as a smart phone or tablet running a payment application.

In some embodiments (e.g., for low-value transactions or for payment transactions that are less than a payment limit indicated by a NFC or EMV payment device 10) the initial processing and approval of the payment transaction may be processed at payment terminal 20. In other embodiments, payment terminal 20 may communicate with payment server 40 over network 30. Although payment server 40 may be operated by a single entity, in one embodiment payment server 40 may include any suitable number of servers operated by any suitable entities, such as a payment service system 50 and one or more banks of the merchant and customer (e.g., a bank server 60). The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and respond to payment terminal 20 over network 30 to indicate whether or not the payment transaction is authorized. Payment server 40 may also transmit additional information such as transaction identifiers to payment terminal 20.

Based on the information that is received at payment terminal 20 from payment server 40, the merchant may indicate to the customer whether the transaction has been approved. In some embodiments such as a chip card payment device, approval may be indicated at the payment terminal, for example, at a screen of a payment terminal. In other embodiments such as a smart phone or watch operating as a NFC payment device, information about the approved transaction and additional information (e.g., receipts, special offers, coupons, or loyalty program information) may be provided to the NFC payment device for display at a screen of the smart phone or watch or storage in memory.

Figure 2:
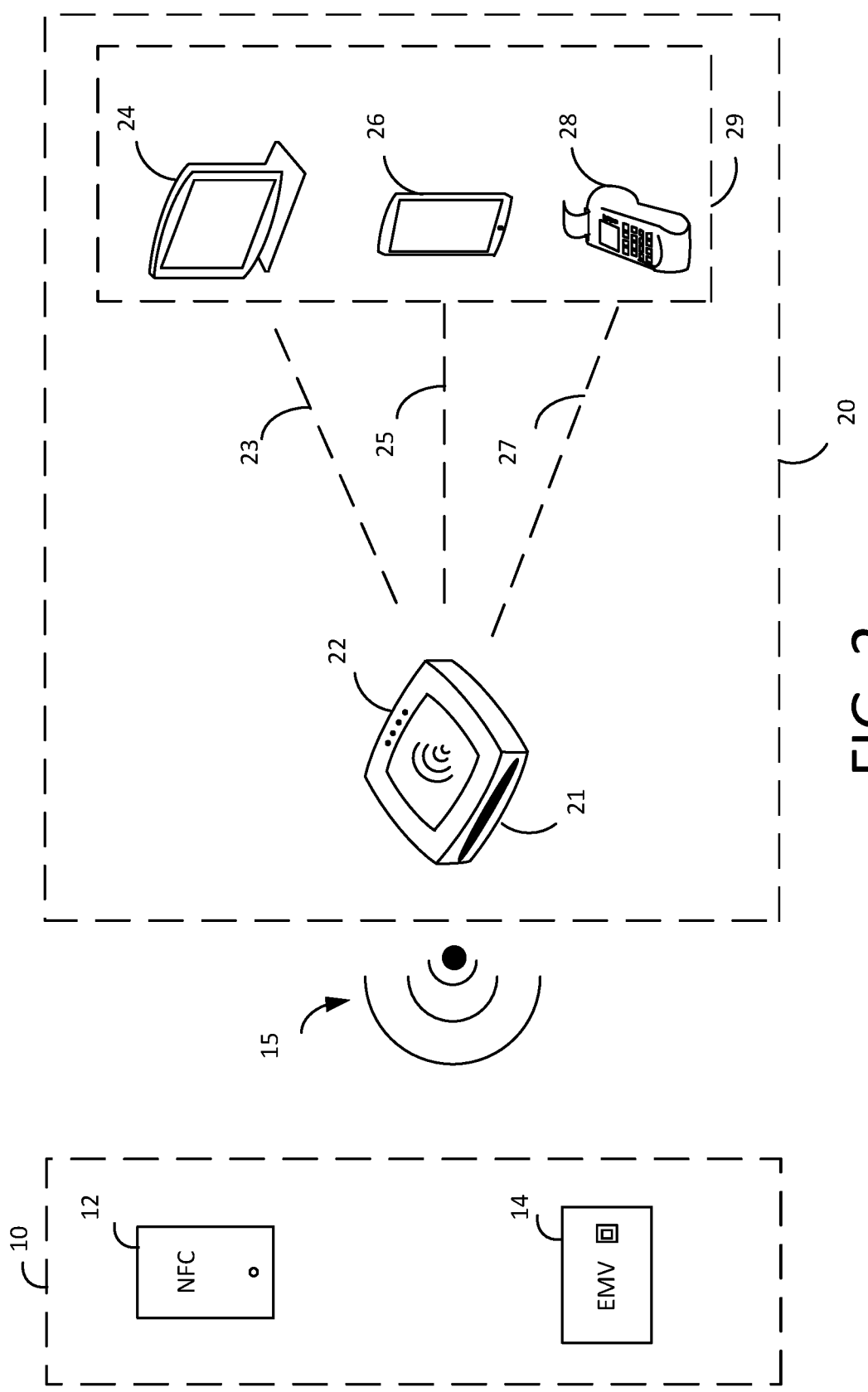
FIG. 2 depicts an illustrative block diagram of a payment device and payment terminal in accordance with some embodiments of the present disclosure.

FIG. 2 depicts an illustrative block diagram of payment device 10 and payment terminal 20 in accordance with some embodiments of the present disclosure. Although it will be understood that payment device 10 and payment terminal 20 of payment system 1 may be implemented in any suitable manner, in one embodiment the payment terminal 20 may comprise a payment reader 22 and a merchant device 29. However, it will be understood that as used herein, the term payment terminal may refer to any suitable component of the payment terminal, such as payment reader 22 or merchant device 29, or any subset of functionality implemented on one or both thereof. In an embodiment, the payment reader 22 of payment terminal 20 may be a wireless communication device that facilitates transactions between the payment device 10 and a merchant device 29 running a point-of-sale application.

In one embodiment, payment device 10 may be a device that is capable of communicating with payment terminal 20 (e.g., via payment reader 22), such as a NFC device 12 or an EMV chip card 14. Chip card 14 may include a secure integrated circuit that is capable of communicating with a payment terminal such as payment terminal 20, generating encrypted payment information, and providing the encrypted payment information as well as other payment or transaction information (e.g., transaction limits for payments that are processed locally) in accordance with one or more electronic payment standards such as those promulgated by EMVCo. Chip card 14 may include contact pins for communicating with payment reader 22 (e.g., in accordance with ISO 7816) and in some embodiments, may be inductively coupled to payment reader 22 via a near field 15. A chip card 14 that is inductively coupled to payment reader 22 may communicate with payment reader 22 using load modulation of a wireless carrier signal that is provided by payment reader 22 in accordance with a wireless communication standard such as ISO 14443.

NFC device 12 may be an electronic device such as a smart phone, tablet, or smart watch that is capable of engaging in secure transactions with payment terminal 20 (e.g., via communications with payment reader 22). NFC device 12 may have hardware (e.g., a secure element including hardware and executable code) and/or software (e.g., executable code operating on a processor in accordance with a host card emulation routine) for performing secure transaction functions. During a payment transaction NFC device 12 may be inductively coupled to payment reader 22 via near field 15 and may communicate with payment terminal 20 by active or passive load modulation of a wireless carrier signal provided by payment reader 22 in accordance with one or more wireless communication standards such as ISO 14443 and ISO 18092.

Although payment terminal 20 may be implemented in any suitable manner, in one embodiment payment terminal 20 may include a payment reader 22 and a merchant device 29. The merchant device 29 runs a point-of-sale application that provides a user interface for the merchant and facilitates communication with the payment reader 22 and the payment server 40. Payment reader 22 may facilitate communications between payment device 10 and merchant device 29. As described herein, a payment device 10 such as NFC device 12 or chip card 14 may communicate with payment reader 22 via inductive coupling. This is depicted in FIG. 2 as near field 15, which comprises a wireless carrier signal having a suitable frequency (e.g., 13.56 MHz) emitted from payment reader 22.

In one embodiment, payment device 10 may be a contactless payment device such as NFC device 12 or chip card 14, and payment reader 22 and the contactless payment device 10 may communicate by modulating the wireless carrier signal within near field 15. In order to communicate information to the contactless device, payment reader 22 changes the amplitude and/or phase of the wireless carrier signal based on data to be transmitted from payment reader 22, resulting in a wireless data signal that is transmitted to the payment device. This signal is transmitted by an antenna of payment reader 22 that is tuned to transmit at 13.56 MHz, and if the contactless device also has a suitably tuned antenna within the range of the near field 15 (e.g., 0 to 10 cm), the payment device receives the wireless carrier signal or wireless data signal that is transmitted by payment reader 22. In the case of a wireless data signal, processing circuitry of the contactless device is able to demodulate the received signal and process the data that is received from payment reader 22.

When a contactless payment device such as payment device 10 is within the range of the near field 15, it is inductively coupled to the payment reader 22. Thus, the contactless device is also capable of modulating the wireless carrier signal via active or passive load modulation. By changing the tuning characteristics of the antenna of the contactless device (e.g., by selectively switching a parallel load into the antenna circuit based on modulated data to be transmitted) the wireless carrier signal is modified at both the contactless device and payment reader 22, resulting in a modulated wireless carrier signal. In this manner, the payment device is capable of sending modulated data to payment reader 22.

In some embodiments, payment reader 22 also includes an EMV slot 21 that is capable of receiving chip card 14. Chip card 14 may have contacts that engage with corresponding contacts of payment reader 22 when chip card 14 is inserted into EMV slot 21. Payment reader 22 provides power to an EMV chip of chip card 14 through these contacts and payment reader 22 and chip card 14 communicate through a communication path established by the contacts.

Payment reader 22 may also include hardware for interfacing with a magnetic strip card (not depicted in FIG. 2). In some embodiments, the hardware may include a slot that guides a customer to swipe or dip the magnetized strip of the magnetic strip card such that a magnetic strip reader can receive payment information from the magnetic strip card. The received payment information is then processed by the payment reader 22.

Payment terminal 20 (e.g., payment reader 22 of payment terminal 20) may have various components to facilitate wireless transactions involving various methods that may be used by payment devices 10 (e.g., NFC communications and EMV cards). As described herein, the ability of payment terminal 20 to wirelessly communicate payment information with a contactless device using inductive coupling may be affected by the relative distance and position of the antenna of the payment terminal 20 and the antenna of the contactless device. For example, payment terminal 20 generally may communicate with a contactless device that is positioned at a variety of distances typical for NFC communication (e.g., 0-10 cm) via inductive coupling (e.g., in a three-dimensional space, at a z-distance). Because the payment terminal 20 and contactless device are typically not constrained in relation to the surfaces of the devices, there may also be a misalignment between the antennas along the planes of those devices (e.g., an x or y misalignment in a three-dimensional space). In addition, a customer may typically hold the contactless device at an angle relative to payment terminal, resulting in additional variability of the relative distance, position, and orientation of the antennas. Moreover, the packaging of antennas within the payment terminal 20 and device 10 may not always place the antennas at the same location relative to the planes of the surfaces of the devices, and materials may impact the operation and effective load of inductively coupled antennas.

As result in these variations in antenna loading (e.g., caused by variability in distance, position, orientation, and materials), the ability to sense changes caused by load modulation of the wireless carrier signal may vary during operation. At some combinations of position and location where the signal-to-noise ratio of attempted load modulation is at a minimum, payment terminal 20 and a contactless device may have difficulty in communicating, resulting in lower data rates or failures. The resulting "dead zones" may represent particular combinations of relevant parameters (e.g., distance, position, orientation, and materials) where communication is poor. In the case of a payment terminal 20 attempting to receive a modulated version of a signal from a contactless device, the contactless device may have difficulty modifying its signal in a manner that counteracts the impacts of these dead zones.

In some embodiments, the payment terminal 20 (e.g., payment reader 22) may have a transponder antenna and an auxiliary antenna. The transponder antenna may transmit the wireless carrier signal, transmit data over a modulated wireless carrier signal, and may receive data via a modulated version of the wireless carrier signal received by inductive coupling. In an embodiment, the auxiliary antenna may selectively be enabled, at which time it may be inductively coupled with the transponder antenna, which may modify the overall inductive coupling of the inductively coupled components (e.g., transponder antenna and an antenna of the contactless device) in a manner that improves performance within dead zones. As described herein, the payment terminal 20 may have an auxiliary control circuit that may enable and disable the auxiliary antenna so that it only receives the RF signal through inductive coupling with the transponder antenna. Although the auxiliary antenna may be positioned within the payment terminal 20 at a fixed location and orientation relative to the transponder antenna (e.g., in parallel to the transponder antenna, and on the opposite side of the transponder antenna from a target region where a user should place a contactless device), it will be understood that the auxiliary antenna may be positioned at any suitable location for coupling with the transponder antenna and performing the functionality of payment terminal 20 described herein.

Merchant device 29 may be any suitable device such as tablet payment device 24, mobile payment device 26, or payment terminal 28. In the case of a computing device such as tablet payment device 24 or mobile payment device 26, a point-of-sale application may provide for the entry of purchase and payment information, interaction with a customer, and communications with a payment server 40. For example, a payment application may provide a menu of services that a merchant is able to select and a series of menus or screens for automating a transaction. A payment application may also facilitate the entry of customer authentication information such as signatures, PIN numbers, or biometric information. Similar functionality may also be provided on a dedicated payment terminal 28.

Merchant device 29 may be in communication with payment reader 22 via a communication path 23/25/27. Although communication path 23/25/27 may be implemented via a wired (e.g., Ethernet, USB, FireWire, Lightning) or wireless (e.g., Wi-Fi, Bluetooth, NFC, or ZigBee) connection, in one embodiment payment reader 22 may communicate with the merchant device 29 via a Bluetooth low energy interface, such that the payment reader 22 and the merchant device 29 are connected devices. In some embodiments processing of the payment transaction may occur locally on payment reader 22 and merchant device 29, for example, when a transaction amount is small or there is no connectivity to the payment server 40. In other embodiments, merchant device 29 or payment reader 22 may communicate with payment server 40 via a public or dedicated communication network 30. Although communication network 30 may be any suitable communication network, in one embodiment communication network 30 may be the internet and payment and transaction information may be communicated between payment terminal 20 and payment server 40 in an encrypted format such by a transport layer security (TLS) or secure sockets layer (SSL) protocol.

Figure 3:
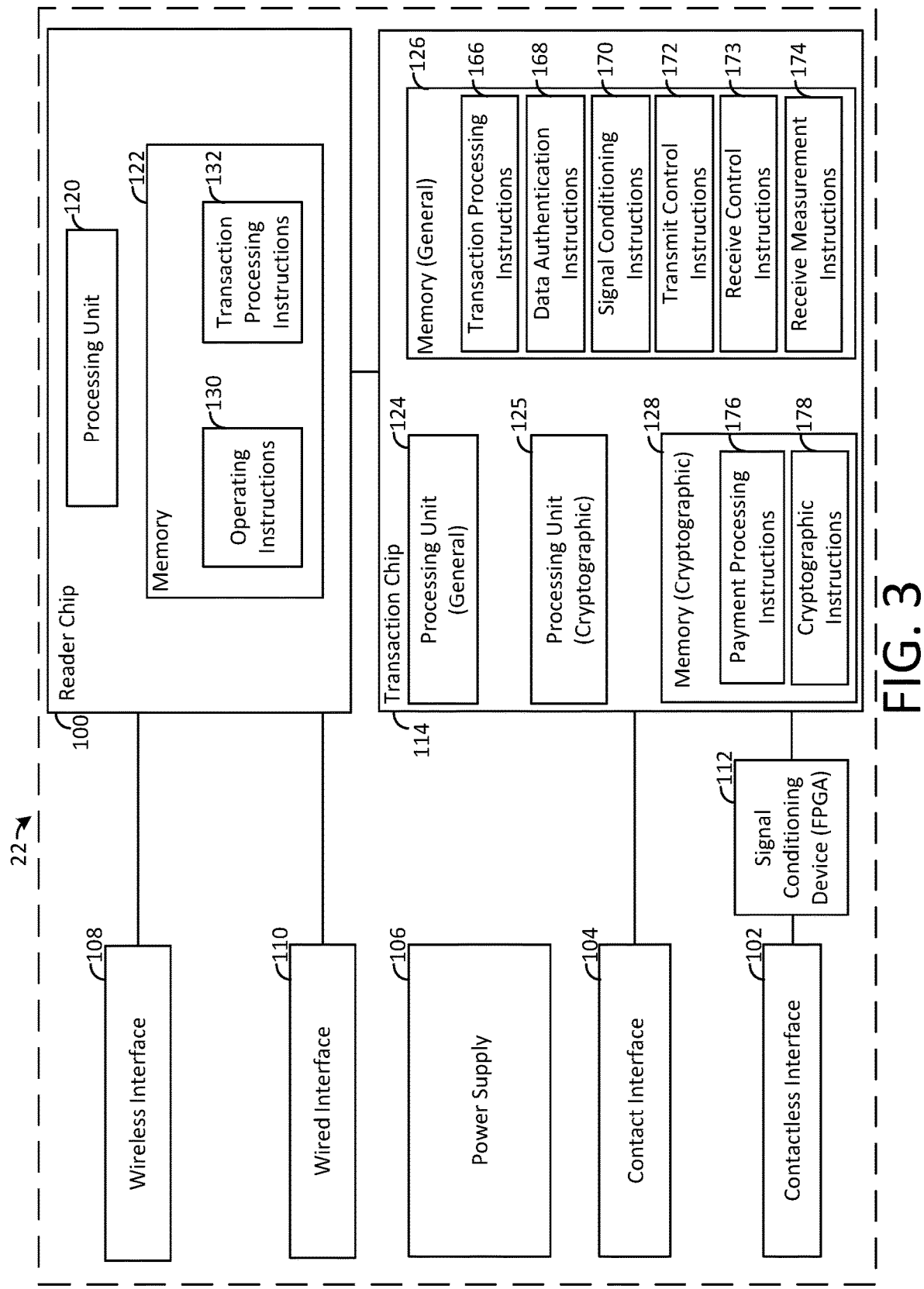
FIG. 3 depicts an illustrative block diagram of a payment reader in accordance with some embodiments of the present disclosure.

FIG. 3 depicts a block diagram of an exemplary payment terminal 20 in accordance with some embodiments of the present disclosure. In one embodiment, payment terminal 20 may be implemented as a payment reader 22 that communicates wirelessly with an interactive electronic device such as a merchant device 29, for example, using Bluetooth classic or Bluetooth low energy. Although particular components are depicted in a particular arrangement in FIG. 3, it will be understood that payment terminal 20 may include additional components, one or more of the components depicted in FIG. 3 may not be included in payment terminal 20, and the components of payment terminal 20 may be rearranged in any suitable manner. In one embodiment, payment terminal 20 includes a reader chip 100, a plurality of payment interfaces (e.g., a contactless interface 102 and a contact interface 104), a power supply 106, a wireless communication interface 108, a wired interface 110, a signal conditioning device 112, and a transaction chip 114. Payment terminal 20 also includes a processing unit 120 and memory 122 in reader chip 100, and general processing unit 124, cryptographic processing unit 125, general memory 126 and cryptographic memory 128 in transaction chip 114. Although in one embodiment the processing unit 120 and memory 122 will be described as packaged in a reader chip 100 and transaction chip 114 respectively, and configured in a particular manner, it will be understood that processing unit 120, general processing unit 124, cryptographic processing unit 125, memory 122, general memory 126, and cryptographic memory 128 may be configured in any suitable manner to perform the functionality of the payment terminal 20 as is described herein. It will also be understood that the functionality of reader chip 100 and transaction chip 114 may be embodied in a single chip or a plurality of chips, each including any suitable combination of processing units and memory to collectively perform the functionalities of reader chip 100 and transaction chip 114 as described herein.

In some embodiments, reader chip 100 may be any suitable chip, such as a K21 chip supplied by Freescale Semiconductor, Inc. Processing unit 120 of reader chip 100 of payment terminal 20 may be any suitable processor and may include any suitable hardware, software, memory, and circuitry as is necessary to perform and control the functions of payment terminal 20. Processing unit 120 may include a number of processors, and may perform the operations of reader chip 100 based on instructions in one or more memories and memory types. In some embodiments, processing unit 120 may have multiple independent processing units, for example a multi-core processor or other suitable component. Processing unit 120 may execute instructions stored in memory 122 of reader chip 100 to control the operations and processing of payment terminal 20. As used herein, a processor or processing unit may include one or more processors having processing capability necessary to perform the processing functions described herein, including but not limited to hardware logic (e.g., hardware designed by software that that describes the configuration of hardware, such as hardware description language (HDL) software), computer readable instructions running on a processor, or any suitable combination thereof. A processor may run software to perform the operations described herein, including software accessed in machine readable form on a tangible non-transitory computer readable storage medium.

In an exemplary embodiment, the processing unit 120 of reader chip 100 may include two RISC processors configured to operate as a hub for controlling operations of the various components of payment terminal 20, based on instructions stored in memory 122. As used herein, memory may refer to any suitable tangible or non-transitory storage medium. Examples of a tangible (or non-transitory) storage medium include disks, thumb drives, and memory, etc., but does not include propagated signals. Tangible computer readable storage mediums include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

Reader chip 100 may also include additional circuitry such as interface circuitry. In one embodiment, interface circuitry may include circuitry for interfacing with a wireless communication interface 108 (e.g., Wi-Fi, Bluetooth classic, and Bluetooth low energy), circuitry for interfacing with a wired interface 110 (e.g., USB, Ethernet, FireWire, and Lightning), circuitry for interfacing with other communication interfaces or buses (e.g., I²C, SPI, UART, and GPIO), and circuitry for interfacing with a power supply 106 (e.g., power management circuitry, power conversion circuitry, rectifiers, and battery charging circuitry).

Wireless communication interface 108 may include any suitable wireless communications hardware (e.g., antennas, matching circuitry, etc.) and one or more processors having processing capability necessary to engage in wireless communication (e.g., with a merchant device 29 via a protocol such as Bluetooth, or directly with a network 30 via a WiFi protocol) and control associated circuitry, including but not limited to hardware logic, computer readable instructions running on a processor, or any suitable combination thereof. Although wireless communication interface 108 may be implemented in any suitable manner, in an exemplary embodiment, wireless communication interface 108 may be implemented as a Texas Instruments CC2640 device, which may include a processing unit and memory in some embodiments.

Power supply 106 may include one or more power supplies such as a physical connection to AC power or a battery. Power supply 106 may include power conversion circuitry for converting AC power and generating a plurality of DC voltages for use by components of payment terminal 20. When power supply 106 includes a battery, the battery may be charged via a physical power connection, via inductive charging, or via any other suitable method. Although not depicted as physically connected to the other components of the payment terminal 20 in FIG. 3, power supply 106 may supply a variety of voltages to the components of the payment terminal 20 in accordance with the requirements of those components.

Wired interface 110 may include any suitable interface for wired communication with other devices or a communication network, such as USB, Lightning, FireWire, Ethernet, any other suitable wired communication interface, or any combination thereof. In some embodiments, wired interface 110 may allow the payment terminal 20 reader to communicate with a payment server 40, or in an embodiment with a separate payment reader 22 and merchant device 29, with a merchant device 29.

Memory 122 of reader chip 100 may include a plurality of sets of instructions for controlling operations of payment terminal 20, such as operating instructions 130 and transaction processing instructions 132.

Operating instructions 130 may include instructions for controlling any suitable general operations of the payment terminal 20, such as internal communications, power management, processing of messages, system monitoring, sleep modes, user interface response and control, operation of the wireless interface 108, operation of the transaction chip 114, and the management of the other sets of instructions. In one embodiment, the operating instructions 130 may provide the operating system and applications necessary to perform most of the processing operations that are performed by the processing unit 120 of the reader chip 100 of payment terminal 20.

Operating instructions 130 may also include instructions for interacting with a merchant. In one embodiment, payment terminal 20 may be running a point-of-sale application. The point-of-sale application may provide a user interface that facilitates a user such as a merchant to engage in purchase transactions with a customer. Menus may provide for the selection of items, calculation of taxes, addition of tips, and other related functionality. The operating instructions 130 facilitate processing of the payment, for example, by acquiring payment information via the contactless interface 102 or contact interface 104, invoking the transaction chip 114 to process that payment information, and by generating responsive messages that are transmitted to the point-of-sale application of the merchant device 29 via wireless interface 108.

In an embodiment where the payment terminal 20 includes a separate payment reader 22 and merchant device 29, aspects of the point-of sale application may run on the merchant device and the operating instructions 130 may include instructions for a complementary application to run on processing unit 120 of reader chip 100, in order to exchange information with the point-of-sale application. When it is time to receive payment, the point-of-sale application may send a message to the payment reader 22 (e.g., via wireless interface 108).

Operating instructions 130 may also include instructions for interacting with a payment service system 50 at a payment server 40. In one embodiment, a payment service system 50 may be associated with the payment terminal 20. For example, the payment service system 50 may have information about payment terminals 20 that are registered with the payment service system 50 (e.g., based on unique identifiers). This information may be used to process transactions with servers of the merchant and customer financial institutions, for providing analysis and reports to a merchant, and aggregating transaction data. The payment terminal 20 may process payment information (e.g., based on operation of reader chip 100 and transaction chip 114) and communicate that processed payment information to the point-of-sale application, which in turn communicates with the payment service system 50. In this manner, messages from the payment terminal 20 may be forwarded to the payment service system 50 of payment server 40, such that the payment terminal 20 and payment service system 50 may collectively process the payment transaction.

Transaction processing instructions 132 may include instructions for processing payment transactions at payment terminal 20. In one embodiment, the transaction processing instructions may be compliant with a payment standard such as those promulgated by EMV. Depending on the payment method that is being used (e.g., Europay, Mastercard, Visa, American Express, etc.), a particular processing procedure associated with the payment method may be selected and the transaction may be processed according to that procedure. When executed by processing unit 120, these instructions may determine whether to process a transaction locally, how payment information is accessed from a payment device, how that payment information is processed, which cryptographic functions to perform, the types of communications to exchange with a payment server, and any other suitable information related to the processing of payment transactions. In some embodiments, transaction processing instructions 132 may perform high level processing, and provide instructions for processing unit 120 to communicate with transaction chip 114 to perform complex transaction processing and cryptographic operations.

Transaction chip 114 may include one or more processors having processing capability necessary to perform the processing functions described herein, including but not limited to hardware logic, computer readable instructions running on a processor, or any suitable combination thereof. In an exemplary embodiment, transaction chip 114 may perform functionality relating to processing of payment transactions, interfacing with payment devices, cryptography, and other payment-specific functionality. In some embodiments, transaction chip 114 may include a general processing unit 124 for executing instructions associated with general payment functionality and a cryptographic processing unit 125 for handling cryptographic processing operations. Each of general processing unit 124 and cryptographic processing unit 125 may have dedicated memory associated therewith (e.g., general memory 126 and memory such as cryptographic memory 128). In this manner, specific cryptographic processing and critical security information (e.g., cryptographic keys, passwords, user information, etc.), may be securely stored and processed by cryptographic memory 128 and cryptographic processing unit 125.

One or both of general processing unit 124 and cryptographic processing unit 125 of transaction chip 114 may communicate with reader chip 100 (e.g., processing unit 120), for example, using any suitable internal bus and communication technique. In this manner, reader chip 100 and transaction chip 114 can collectively process transactions and communicate information regarding processed transactions.

Transaction chip 114 may also include circuitry for interfacing with a contact interface 104 (e.g., power and communication circuitry for directly interfacing with an EMV chip of a chip card 14 that is inserted in slot 21). In some embodiments, transaction chip 114 may also include analog front end circuitry for interfacing with the analog components of contactless interface 102 (e.g., electromagnetic compatibility (EMC) circuitry, matching circuits, modulation circuitry, and measurement circuitry). It will be understood that, while FIG. 3 depicts one connection between each of the contactless interface 102 and contact interface 104 for simplicity, any number of connections is possible to achieve the functionality described herein.

In some embodiments, general processing unit 124 may include any suitable processor for performing the payment processing functionality of payment terminal 20 described herein. In some embodiments, general memory 126 may include a plurality of sets of instructions for performing general transaction processing operations of payment terminal 20, such as transaction processing instructions 166, data authentication instructions 168, and signal conditioning instructions 170. General memory 126 also may include instructions for performing wireless NFC communications described herein between the payment terminal 20 and a contactless device, such as transmit control instructions 172, receive control instructions 173, and receive measurement instructions 174.

Transaction processing instructions 166 may include instructions for controlling general transaction processing operations of the payment terminal 20, such as controlling the interaction between the payment terminal 20 and a payment device 10 (e.g., for interfacing with a payment device via the contactless interface 102 and contact interface 104), selecting payment processing procedures (e.g., based on a payment processing entity associated with a payment method), interfacing with the cryptographic processor 125, and other aspects of transaction processing. Data authentication instructions 168 may include instructions for providing configuration information for a payment terminal 20. The configuration information may include such information as payment limits and types of transactions for local transactions (i.e., transactions that occur without contacting a payment server 40) and supported applications. As an example, in some embodiments, data authentication instructions 168 may include configuration instructions such as TMS-CAPK instructions. In some embodiments, the TMS-CAPK may be tailored for a particular jurisdiction (e.g., country-specific).

Signal conditioning instructions 170 may include instructions for interacting with signal conditioning device 112, including instructions for conditioning signals received from a contactless device via the contactless interface 102 (e.g., from a NFC payment device 10). Although in some embodiments, signal conditioning instructions 170 may include instructions for manipulating signals received via contactless interface 102, wherein the signal conditioning device 112 is a field programmable gate array (FPGA), in other embodiments, signal conditioning instructions 170 may include instructions for conditioning signals using any suitable hardware, logic, or algorithm required to process NFC signals received via contactless interface 102.

Transmit control instructions 172 may include instructions for determining an occurrence of an event for which transmission of a modulated wireless signal may be desired and enabling the general processing unit 124 to wirelessly communicate with a contactless device. In some embodiments, transmit control instructions 172 may include instructions for providing a wireless carrier signal to the transponder antenna of the contactless interface 102 of payment terminal 20 and selectively modulating the wireless carrier signal (e.g., by adjusting a load applied to the transponder antenna). Receive control instructions 173 may include instructions for receiving and processing a modulated version of the wireless carrier signal received at the transponder antenna of the contactless interface 102 (e.g., from a contactless device), and selectively providing a control signal to a control input of an auxiliary circuit within the payment terminal 20 in order to selectively enable an auxiliary antenna of the contactless interface. Receive measurement instructions 174 may include instructions for demodulating a received modulated version of the wireless carrier signal received based on inductive coupling of the payment terminal 20 and a contactless device.

Cryptographic processing unit 125 may be a processor as described herein, and, in some embodiments, may perform cryptographic functions for the processing of payment transactions. For example, in some embodiments a cryptographic processing unit 125 may encrypt and decrypt data based on one or more encryption keys, in a manner that isolates the encryption functionality from other components of payment terminal 20 and protects the encryption keys from being exposed to other components of payment terminal 20.

In some embodiments, cryptographic memory 128 may be a memory or combination thereof as described herein, and may include a plurality of sets of instructions for performing cryptographic operations, such as payment processing instructions 176 and cryptographic instructions 178. Payment processing instructions 176 may include instructions for performing aspects of payment processing, such as providing for encryption techniques to be used in association with particular payment procedures, accessing account and processing information, any other suitable payment processing functionality, or any suitable combination thereof. Cryptographic instructions 178 may include instructions for performing cryptographic operations. Cryptographic processing unit 125 may execute the cryptographic instructions 178 to perform a variety of cryptographic functions, such as to encrypt, decrypt, sign, verify signatures, and process transaction information as part of a payment transaction.

Although signal conditioning device 112 may include any suitable hardware, software, or any combination thereof, in an exemplary embodiment signal conditioning device may comprise an FPGA. Signal condition device 112 may receive and condition signals sent from contactless interface 102, such as when a contactless device using NFC communication communicates with payment terminal 20. In an embodiment, signal conditioning device 112 may operate based on instructions stored at transaction chip 114 (e.g., signal conditioning instructions 170) for use in interacting with the contactless interface 102.

Contactless interface 102 may provide for NFC communication with a contactless device such as NFC device 12 or chip card 14. Based on a signal provided by transaction chip 114, an antenna of contactless interface 102, such as a transponder antenna, may output either a carrier signal or a modulated signal. A carrier signal may be a signal having a fixed frequency such as 13.56 MHz. A modulated signal may be a modulated version of the carrier signal according to a modulation procedure such as ISO 14443 and ISO 18092. When the payment terminal 20 is inductively coupled to a contactless device such as a contactless payment device 10, the contactless device may also modulate the carrier signal, which may be sensed by the contactless interface 102 and provided to the transaction chip 114 for processing. Based on these modulations of the carrier signal, payment terminal 20 and a contactless device are able to communicate information such as payment information. As described herein, the contactless interface 102 may also include an auxiliary antenna and auxiliary circuit. The auxiliary antenna may be selectively enabled in order to modify the inductive coupling of the transponder antenna to a contactless device such as a contactless payment device 10, for example, during periods of operation in which the payment terminal 20 is not transmitting a modulated signal. In some embodiments, some or all of the components of the auxiliary circuit may be included within the transaction chip 114, for example, as analog front end circuitry.

Contact interface 104 may be a suitable interface for providing power to a payment chip such as an EMV chip of a chip card 14 and communicating with the EMV chip. Contact interface 104 may include a plurality of contact pins (not depicted in FIG. 3) for physically interfacing with the chip card 14 according to EMV specifications. In an embodiment, contact interface 104 may include a power supply (VCC) pin, a ground (GND) pin, a reset (RST) pin for resetting an EMV card, a clock (CLK) pin for providing a clock signal, a programming voltage (VPP) pin for providing a programming voltage to an EMV card, an input output (I/O) pin for providing for EMV communications, and two auxiliary pins. In this manner, the payment reader and the chip card are able to exchange information such as payment information.

Figure 4:
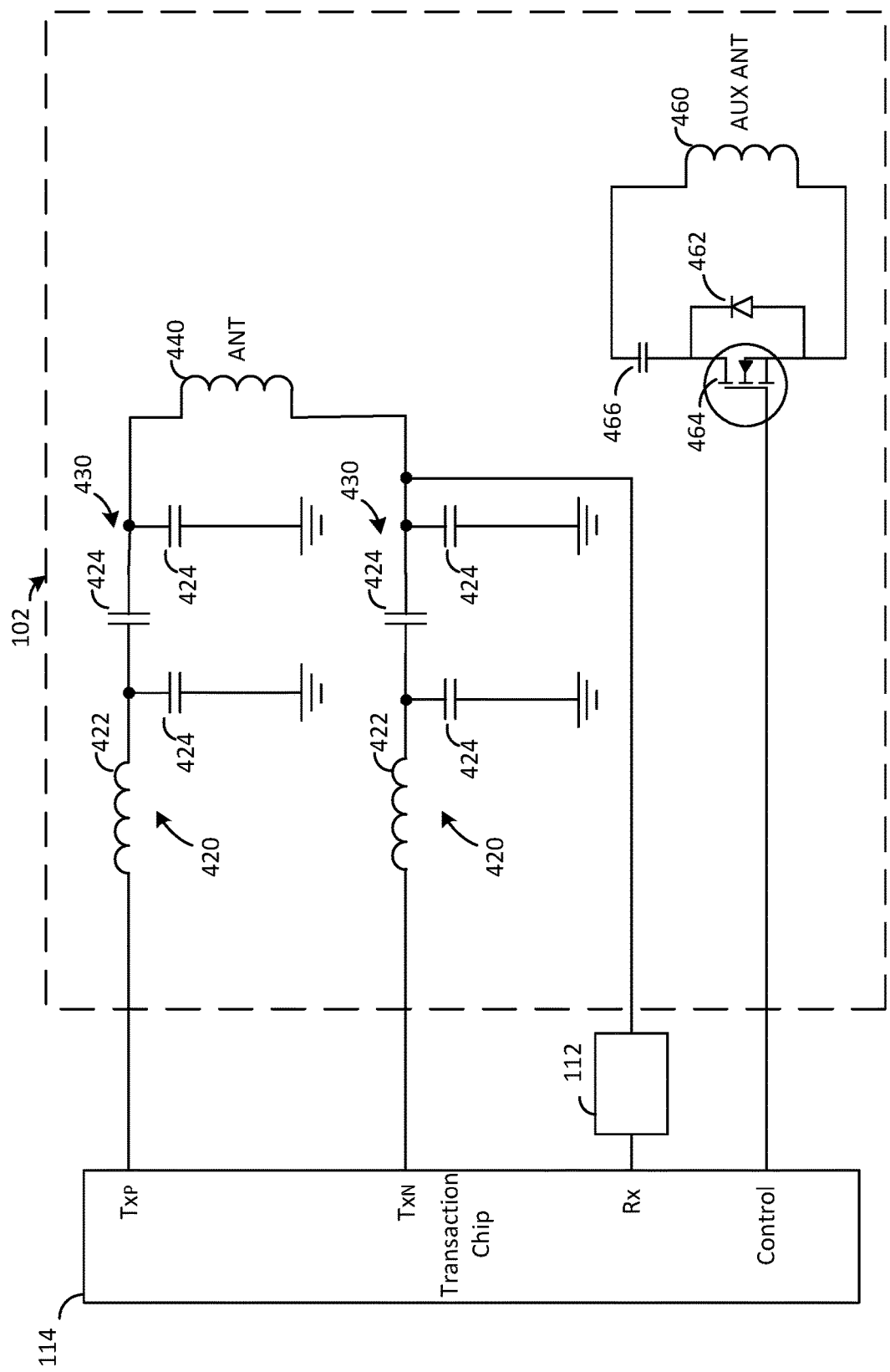
FIG. 4 depicts an exemplary transaction chip and contactless interface of a payment terminal in accordance with some embodiments of the present disclosure.

FIG. 4 depicts an exemplary transaction chip 114 and contactless interface 102 of a payment terminal 20 in accordance with some embodiments of the present disclosure. Although particular components are depicted in a particular arrangement in FIG. 4, it will be understood that the transaction chip 114 and contactless interface 102 may include additional components, one or more of the components depicted in FIG. 4 may not be included, and the components depicted in FIG. 4 may be rearranged in any suitable manner.

Transaction chip 114 may include hardware, software, memory, and circuitry as described herein, and in an embodiment, is in communication with contactless interface 102 via a plurality of pins such as a positive transmit pin ($T_{XP}$), negative transmit pin ($T_{XN}$), receive pin ($R_X$), and an auxiliary control signal (Control). Transmit pins $T_{XP}$ and $T_{XN}$ may provide a transmit signal having a power, amplitude, frequency, phase, and waveform that enable the wireless carrier signal and modulated wireless signal to be transmitted from an antenna 440 of contactless interface 102. In an embodiment, the transmit signal may be provided to the antenna 440 via EMC circuit 420 and matching circuit 430. Although not depicted in FIG. 4, in some embodiments the transaction chip may include additional outputs that provide signals to generate the modulated wireless signal (e.g., by controlling a load of contactless interface 102) or adjust other signal characteristics such as transmit power (e.g., based on providing a signal to power control circuitry such as an H-Bridge of contactless interface 102).

The transmitted signal may be provided to EMC circuit 420. In some embodiments, EMC circuit 420 may include an electromagnetic interference (EMI) filter for suppressing interference experienced at contactless interface 102, and may include one or more components such as inductor 422 and capacitor 424 in order to provide acceptable electromagnetic compatibility with other high-frequency signals.

The output of EMC circuit 420 may be provided to matching circuit 430. Matching circuit 430 may include suitable components such as resistors, inductors, and capacitors to provide for impedance matching and tuning of transponder antenna 440. In the embodiment of FIG. 4, matching circuit 430 includes a pair of capacitors 424, but matching circuit 430 may include any suitable components in other embodiments.

Collectively, any of modulation circuitry, power circuitry, EMC circuit 420, and matching circuit 430 may form a transmit circuit that is coupled to transponder antenna 440. However, it will be understood that the transmit circuit may include other suitable circuitry that couples the transaction chip 114 to the antenna 440, that the circuit components depicted in FIG. 4 may be arranged in a different manner, and that components may be added or omitted therefrom. In some embodiments, the transmit circuit operates as a transmit load for the transponder antenna 440. When transmitting the wireless carrier signal or modulated wireless signal, the signal characteristics and inductive coupling of antenna 440 are based on this transmit load.

During operation of transaction chip 114 of payment terminal 20, transmit pins $T_{XP}$ and $T_{XN}$ may output either a wireless carrier signal or a modulated wireless signal. A wireless carrier signal may be a signal having a fixed frequency such as 13.56 MHz. Components of EMC circuit 420 and matching circuit 430 (e.g., resistors, inductors, and capacitors) modify the output waveform of the wireless carrier signal. A first portion of the transmit circuit thus couples the output of the $T_{XP}$ pin to a first terminal of transponder antenna 440 while a second portion of the transmit circuit couples the output of the $T_{XN}$ pin to a second terminal of transponder antenna 440. The wireless carrier signal is then transmitted over transponder antenna 440.

During periods when modulation is applied to the wireless carrier signal (i.e., transmit periods) based on the outputs from transaction chip 114, a modulated wireless signal is output from the antenna. The modulated wireless signal varies from the wireless carrier signal in its amplitude, phase, or both in response to a data signal. As is described herein, transaction chip 114 may implement a modulation procedure in order to generate the modulated wireless signal, either alone or in combination with modulation circuitry. This modulated wireless signal is provided to the transmit circuit and transmitted over antenna 440 as a modulated wireless signal (representing data to be transmitted) during a transmit event.

Transaction chip 114 monitors the signal at transponder antenna 440 through receive pin $R_X$. The receive pin $R_X$ is coupled to a receive circuit, which in an embodiment may include signal conditioning device 112 and/or other circuitry (e.g., matching circuitry) and which may be coupled to a second terminal of transponder antenna 440 through this circuitry. In this manner, transaction chip 114 may monitor what is being transmitted (e.g., the wireless carrier signal and modulated wireless signal) as well as changes that are applied to the wireless carrier signal by a contactless payment device 10 such as NFC device 12 or chip card 14. A period during which the transaction chip 114 monitors for a signal that results from modulation of the wireless carrier signal by another device (e.g., modulation of the wireless carrier signal by a contactless payment device 10 such as NFC device 12 or chip card 14), may be referred to as a receive event. Based on these modulations of this received signal, transaction chip 114 is able to receive communications from the contactless payment device 10.

In some embodiments, auxiliary antenna 460 may be positioned within payment terminal 20 to facilitate inductive coupling of the transponder antenna 440 and an antenna of the contactless payment device 10. Although the auxiliary antenna 460 may be positioned in any suitable location relative to the transponder antenna 440, in an embodiment the auxiliary antenna 460 may be positioned in parallel to the transponder antenna 440, and on the opposite side of the transponder antenna from a payment terminal 20 target region (e.g., where a user is expected to tap the contactless device). Although any suitable antenna types may be implemented, in an embodiment each of the transponder antenna 440 and auxiliary antenna 460 may be square loop antennas of approximately similar dimensions (e.g., with the transponder antenna 440 slightly larger than the auxiliary antenna 460). In an embodiment, one or both of the antennas may be single-loop antennas of approximately the same size.

In an embodiment, the auxiliary antenna may only operate during certain time periods. Although an auxiliary antenna may operate during any suitable time periods (e.g., transmit events, receive events, modulated portions of transmit events, etc.), in an exemplary embodiment the auxiliary antenna 460 may be enabled during receive events. In order to enable the auxiliary antenna, the transaction chip 114 may provide an enabling signal from its control output to a switching circuit (e.g., parallel MOSFET 464 and diode 462). The switching circuit may close the switching circuit in response to the enabling signal and in order to enable the auxiliary antenna 460. When the transponder antenna 440 transmits the wireless carrier signal while the auxiliary antenna is enabled, the overall inductive loading of the magnetic circuit (e.g., including the transponder antenna 440, an antenna of a contactless payment device 10, the auxiliary antennas, and loads associated with each of these antennas) is changed.

The auxiliary antenna 460 may also be coupled to an auxiliary load circuit. The auxiliary load circuit may include components such as a capacitor 466 and a resistor (not depicted) and may be coupled to a second terminal of auxiliary antenna 460.

Transaction chip 114 may execute instructions stored in memory 126 (e.g., transmit control instructions 172 and receive control instructions 173) to provide enabling and disabling signals (e.g., different levels of a signal that cause the antenna to be enabled or disabled) to the switching circuit (e.g., the gate of MOSFET 464) for enabling or disabling the auxiliary antenna 460. In some embodiments, transaction chip 114 may execute transmit control instructions 172 (e.g., using processing unit 124) during a transmit event to provide a disabling signal to the switching circuit at the control input. The switching circuit may disable the auxiliary antenna 460 in response to a disabling control signal from transaction chip 114 (i.e., so that it cannot couple with the transponder antenna 440). In some embodiments, transaction chip 114 may execute receive control instructions 173 (e.g., using processing unit 124) during a receive event to provide an enabling signal to the switching circuit at the control input. The switching circuit may enable the auxiliary antenna 460 in response to an enabling signal at the control input from transaction chip 114 (i.e., so that it couples with the transponder antenna 440).

Transaction chip 114 may execute instructions stored in memory 126 to provide a modulated wireless signal to the transmit circuit during a transmit event. In some embodiments, transaction chip 114 may execute transmit control instructions 172 (e.g., using processing unit 124) during a transmit event to provide a modulated wireless signal to the transmit circuit for transmission via the transponder antenna 440. The transponder antenna 440 may transmit the modulated wireless signal (e.g., with encoded) data for wireless communication with a contactless device during the transmit event. As noted above, the transaction chip 114 may provide a disabling signal to the control input during the transmit event based on transmit control instructions 172.

Transaction chip 114 may execute instructions stored in memory 126 to provide a wireless carrier signal to the transmit circuit during a receive event. In some embodiments, transaction chip 114 may execute receive control instructions 173 (e.g., using processing unit 124) during a receive event to provide the wireless carrier signal to the transmit circuit for transmission via the transponder antenna 440. The transponder antenna 440 may transmit the carrier signal during the receive event. As noted above, the transaction chip 114 may provide an enabling signal to the control input of the switching circuit in order to enable the auxiliary antenna during the receive event based on receive control instructions 173.

Transaction chip 114 may execute instructions stored in memory 126 to demodulate received signals at payment terminal 20. In some embodiments, transaction chip 114 may execute receive measurement instructions 174 (e.g., using processing unit 124) during a receive event to demodulate the received signal. Receive measurement instructions 174 may include instructions for demodulating a received signal (e.g., extracting a data signal based on the modulations of received signal based on a known modulation procedure). In some embodiments, receive measurement instructions 174 may include instructions for determining characteristics such as the transmit power from payment terminal 20, characteristics of the wireless carrier signal (e.g., frequency, phase, waveform morphology, and amplitude), characteristics of the modulated wireless carrier signal (e.g., frequency, phase, waveform morphology, and amplitude), characteristics of the wireless data signal (e.g., frequency, phase, waveform morphology, and amplitude), receive sensitivity of one or both of payment terminal 20 and contactless device (e.g., the ability of the payment terminal 20 or contactless device to receive and demodulate a modulated wireless carrier signal or wireless data signal), and a modulation index (e.g., a modulation index indicative of the amplitude modulation for a type-A signaling). This information may be collected and processed by transaction chip 114 using receive measurement instructions 174 for use during the operation of payment terminal 20.

Figure 5:
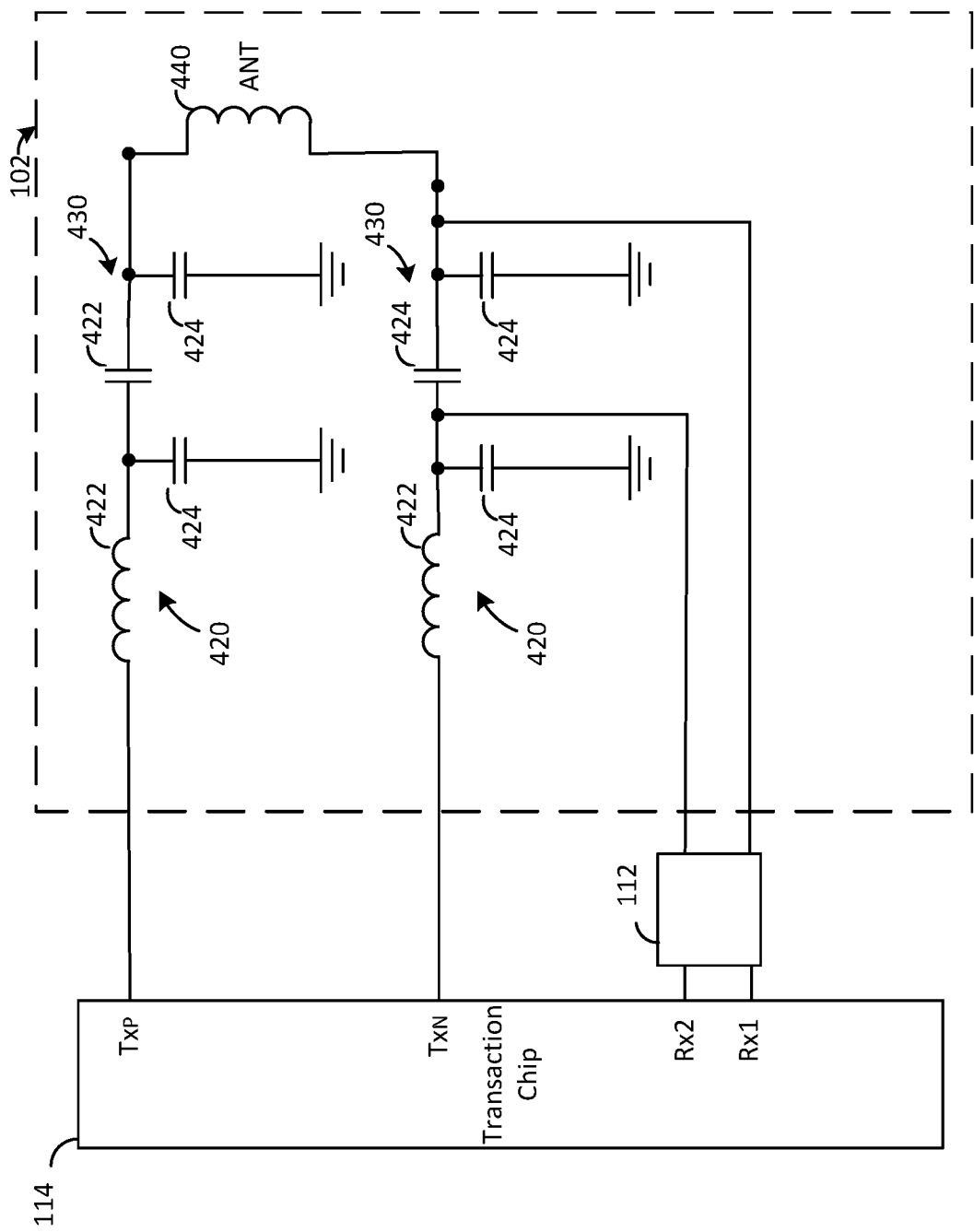
FIG. 5 depicts another embodiment of a transaction chip and contactless interface of a payment terminal in accordance with some embodiments of the present disclosure.

FIG. 5 depicts circuit diagram of an exemplary transaction chip 114 and contactless interface 102 in accordance with some embodiments of the present disclosure. Although particular components are depicted in a particular arrangement in FIG. 5, it will be understood that transaction chip 114 and contactless interface 102 may include additional components, one or more of the components depicted in FIG. 5 may not be included, and the components of may be rearranged in any suitable manner. In an embodiment, the transaction chip 114 and contactless interface 102 of FIG. 5 may include a number of components that operate in a similar manner as similarly labeled and numbered components of FIG. 4, such as EMC circuit 420, matching circuit 430, transponder antenna 440, signal conditioning circuit 112, transmit pin ($T_{XP}$), and negative transmit pin ($T_{XN}$).

In an embodiment as depicted in FIG. 5, transaction chip 114 of payment terminal 20 may include two receive pins ($R_{X1}$ and $R_{X2}$). The receive pins $R_{X1}$ and $R_{X2}$ are coupled at different points relative to transponder antenna 440, EMC circuit 420, and matching circuitry 430.

While FIG. 5 depicts individual capacitors 424 in EMI filter of EMC circuit 420, in some embodiments, other components and arrangements of EMI filter in EMC circuit 420 and matching circuit 430 are possible. In one embodiment, EMC circuit 420 and matching circuit 430 may include two or more weighted capacitors 424 (i.e., by varying capacitance rating of each capacitor 424) that may be arranged in series in order to impart desired characteristics on a received signal from transponder antenna 440. In this regard, capacitors 424 of either EMC circuit 420 or matching circuit 430 arranged in series may provide locations on the transmit circuit for coupling receive pins $R_{X1}$ and $R_{X2}$ of transaction chip 114. This may enable transaction chip 114 to receive a received signal from the antenna 440 at such locations based on the coupling of receive pins $R_{X1}$ and $R_{X2}$.

Receive performance at the payment terminal 20 may be improved by selecting between $R_{X1}$ and $R_{X2}$ as a source of the received signal. In some embodiments, transaction chip 114 may select between $R_{X1}$ and $R_{X2}$ (or in some embodiments, select weightings to be applied to the signals received at $R_{X1}$ and $R_{X2}$) based on the characteristics of the received signals, based on a particular mode of operation of the payment terminal 20 (e.g., modulation procedure, type of contactless device, etc.), or based on one or more other measured values (e.g., a signal strength, distance, modulation index, etc.), as determined by a measurement circuit (not depicted). For example, transaction chip 114 may observe electrical characteristics of the transponder antenna or inductively coupled signal (e.g., transmit power, receive power, amplitude, phase, impedance) to determine an estimate of a distance between a target area of the payment terminal 20 and a contactless device and compare the distance with a pre-defined threshold. Transaction chip 114 may then select a receive pin to use for data processing based on the comparison. By processing signals based on only the selected receive pin, transaction chip 114 may better and monitor and demodulate a received signal from a contactless device.

Figure 6:
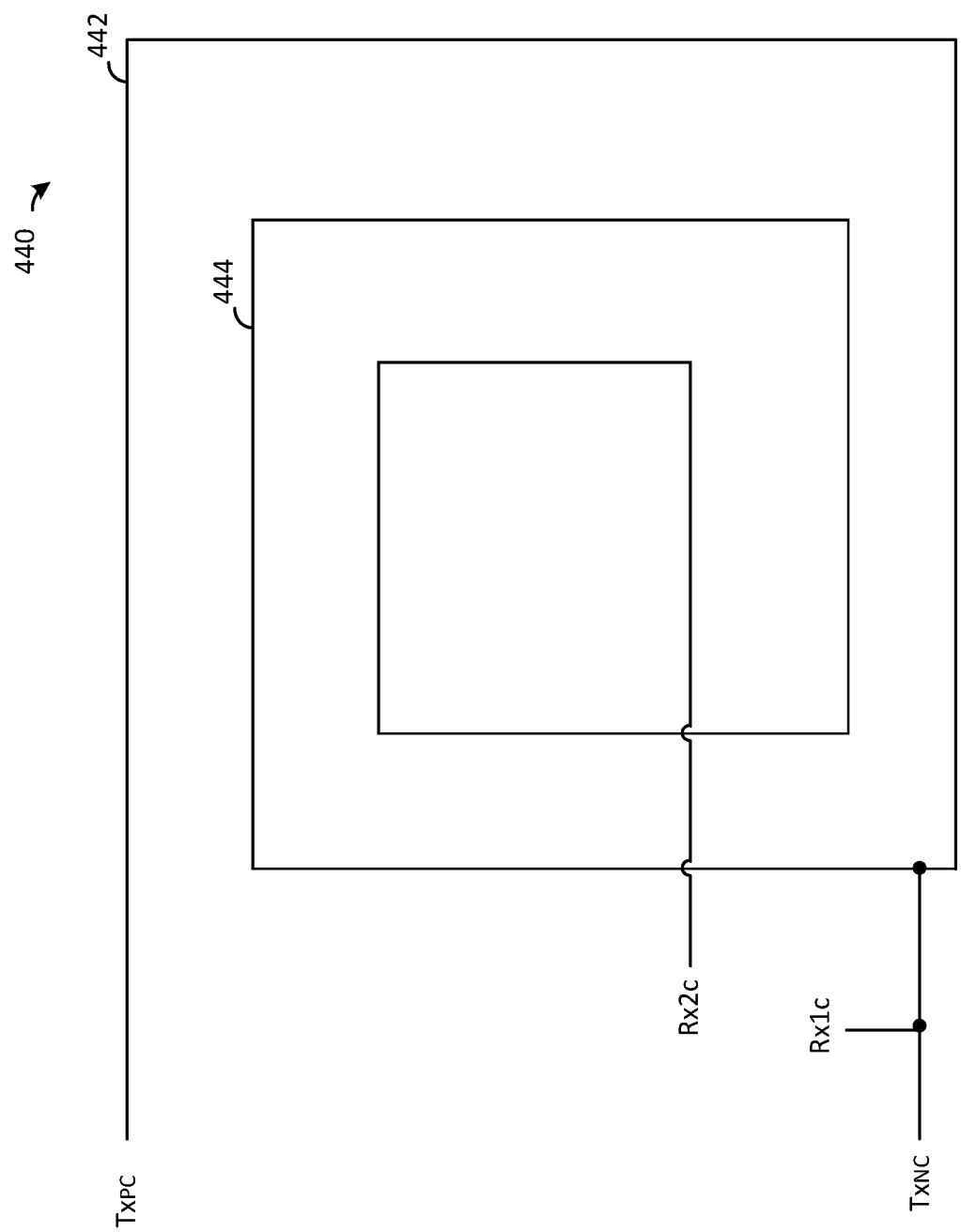
FIG. 6 depicts an illustrative series antenna in accordance with some embodiments of the present disclosure.

FIG. 6 depicts an illustrative series transponder antenna 440 in accordance with some embodiments of the present disclosure. In embodiment, transponder antenna 440 may be a component of wireless interface 102 and may be coupled to a transmit circuit and receive circuit as described herein, and through these circuits, to a transaction chip 114.

In an embodiment, the transponder antenna 440 may include a plurality of portions arranged in series, such that different tap points may be used to acquire different signal. Although the transponder antenna 440 portions may be arranged in any suitable manner, in an embodiment, transponder antenna 440 may include a transmit portion 442 and receive portion 444 that are arranged in series. In an embodiment, each portion may include one or more square loops on a common plane, with a subset of the loops (e.g., the loops of the receive portion 444 as depicted in FIG. 6) located inside of the other loops, although other configurations for looped antenna portions (e.g., on multiple planes, different loop configurations, etc.) may be implemented in other embodiments. Although a particular shape is described and depicted in FIG. 6, it will be understood that transponder antenna may include different shapes (e.g., circular, hexagon, etc.) and that the shape need not be symmetric.

In some embodiments a plurality of receive tap points may be provided at different portions of the transponder antenna 440. Although multiple tap points may be located at multiple locations of transponder antenna 440, in an exemplary embodiment two receive taps $R_{X1C}$ and $R_{X2C}$ may be located to receive the signal from the transmit portion 442 and receive portion 444, respectively. In this manner, transaction chip 114 may selectively monitor at different points of the overall transponder antenna 440, for example, based on a mode of the payment terminal and/or measured characteristics as described herein. Although not depicted in FIG. 6, additional transmit taps may also be provided at multiple locations within the transponder antenna, such that the effective transmit portion 442 of the transponder antenna 440 may be actively changed, for example, based on a mode of the payment terminal and/or measured characteristics as described herein. Although not depicted in FIG. 6, in an embodiment antenna control circuits may be provided in order to enable or disable some or all of the transmit portions or receive portions (e.g., by enabling the receive portion only during receive events as described herein with respect to the auxiliary antenna 460).

Figure 7:
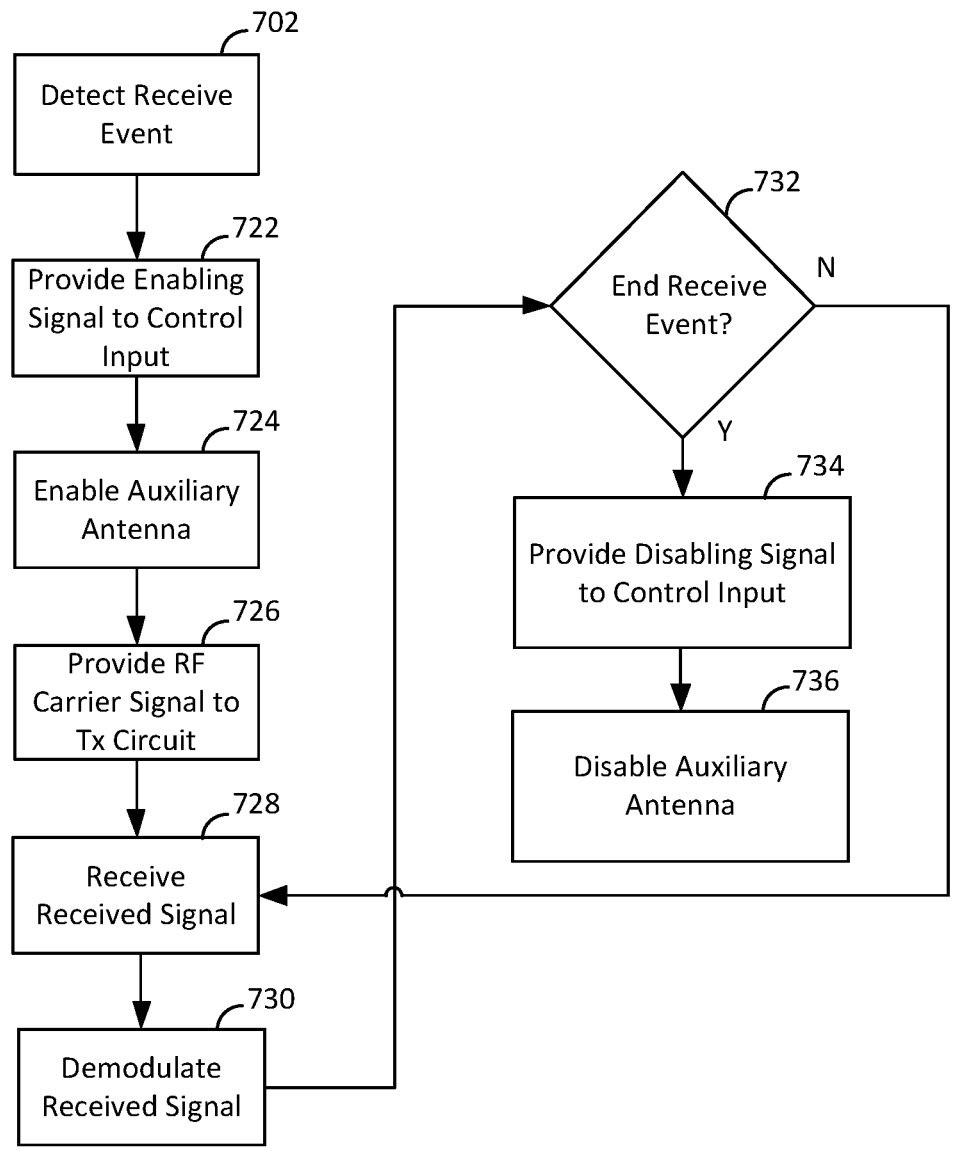
FIG. 7 depicts a non-limiting flow diagram illustrating exemplary methods for wirelessly communicating payment information with a payment device in accordance with some embodiments of the present disclosure.

FIG. 7 depicts a non-limiting flow diagram illustrating exemplary methods for wirelessly communicating payment information with a payment device based on inductive coupling of a radio frequency (RF) signal that is transmitted by the payment terminal in accordance with some embodiments of the present disclosure. Although it will be understood that any suitable device may wirelessly communicate payment information with a payment device, in an exemplary embodiment, the wireless communication may be NFC communication, the wireless communication device may be a payment terminal 20, and the payment device may be a contactless payment device 10.

At step 702, payment terminal 20 may determine that a receive event based on processing unit 124 of transaction chip 114 executing receive control instructions 173. Although a variety of receive events may be possible, in one embodiment, a receive event may be an event in which a received signal is received by transmit circuit of payment terminal 20 that is indicative of modulation of a wireless carrier signal, such as modulation of the wireless carrier signal by a contactless payment device 10. In another embodiment, payment terminal 20 may determine that a receive event is occurring whenever data is not being transmitted by payment terminal 20 (e.g., at times other than transmit events). Once transaction chip 114 has detected an occurrence of a receive event, processing may continue to step 722.

At step 722, transaction chip 114 may provide an enabling signal to the control input based on processing unit 124 of transaction chip 114 executing receive control instructions 173. As described herein, processing unit 124 may execute receive control instructions 173 in response to detection of a receive event at the payment terminal 20. After transaction chip 114 provides the enabling signal to the control input, processing may continue to step 724.

At step 724, a switching circuit of payment terminal 20 may enable auxiliary antenna 460 in response to an enabling signal at the control input. As described herein, the switching circuit may be coupled to auxiliary antenna 460 and the control pin of transaction chip 114, and may enable the auxiliary antenna 460. Auxiliary antenna 460 may be positioned at a location and orientation relative to the transponder antenna 440 that permits inductive coupling of a load represented by a received signal. Once the switching circuit enables auxiliary antenna 460, processing may continue to step 726.

At step 726, transaction chip 114 may provide a wireless carrier signal to a transmit circuit of payment terminal 20 based on processing unit 124 executing receive control instructions 173. In some embodiments, the transmit circuit of payment terminal 20 may be coupled to the transponder antenna 440. After the wireless carrier signal has been provided to the transmit circuit, processing may continue to step 728.

At step 728, the receive circuit of payment terminal 20 may output a receive signal to transaction chip 114 representing an inductively coupled load that modulates the wireless carrier signal. During receive events, receive circuit may output to the transaction chip 114 a received signal based on modulation of the wireless carrier signal provided to the transponder antenna 440 at step 726. The received signal output by the receive circuit represents an inductively coupled a load for the wireless carrier signal that is based on auxiliary antenna 460 and modulations created at an antenna of contactless payment device 10 (e.g., by a load of the contactless payment device 10). The inductively coupled load enables payment terminal 20 to communicate receive data from payment device 10 via transponder antenna 440 and auxiliary antenna 460. After the received signal is received, processing may continue to step 730.

At step 730, transaction chip 114 may demodulate the received signal based on the processing unit 124 executing receive measurement instructions 174. Processing circuitry of transaction chip 114, such as processing unit 124 may receive and demodulate the wireless carrier signal received from contactless payment device 10 and provide data for use by other resources of payment terminal 20 based on the demodulated received signal. After the processing unit 124 demodulates the received signal based on receive measurement instructions 174, processing may continue to step 732.

At step 732, transaction chip 114 may determine whether the receive event has ended based on processing unit 124 executing receive measurement instructions 174. Processing unit 124 may execute measurement instructions 174 to process the data represented by the demodulated received signal and determine whether the receive event has ended. If processing unit 124 determines that the receive event has ended, processing may continue to step 734. If processing unit 124 determines that the receive event has not ended, processing may return to step 728.

At step 734, transaction chip 114 may provide a disabling signal to control input based on processing unit 124 of transaction chip 114 executing transmit control instructions 172. After transaction chip 114 provides the disabling signal is provided to the control input, processing may continue to step 724.

At step 736, the switching circuit may disable the auxiliary antenna in response to a disabling signal provided to the control input by processing unit 124 of transaction chip 114 executing transmit control instructions 172. As described herein, the control input of the switching circuit of NFC circuit 400 may be coupled to auxiliary antenna 460 and control pin of transaction chip 114, and may disable the auxiliary antenna 460. Once the transaction chip 114 has disabled the auxiliary antenna 460, processing may end.

Figure 8:
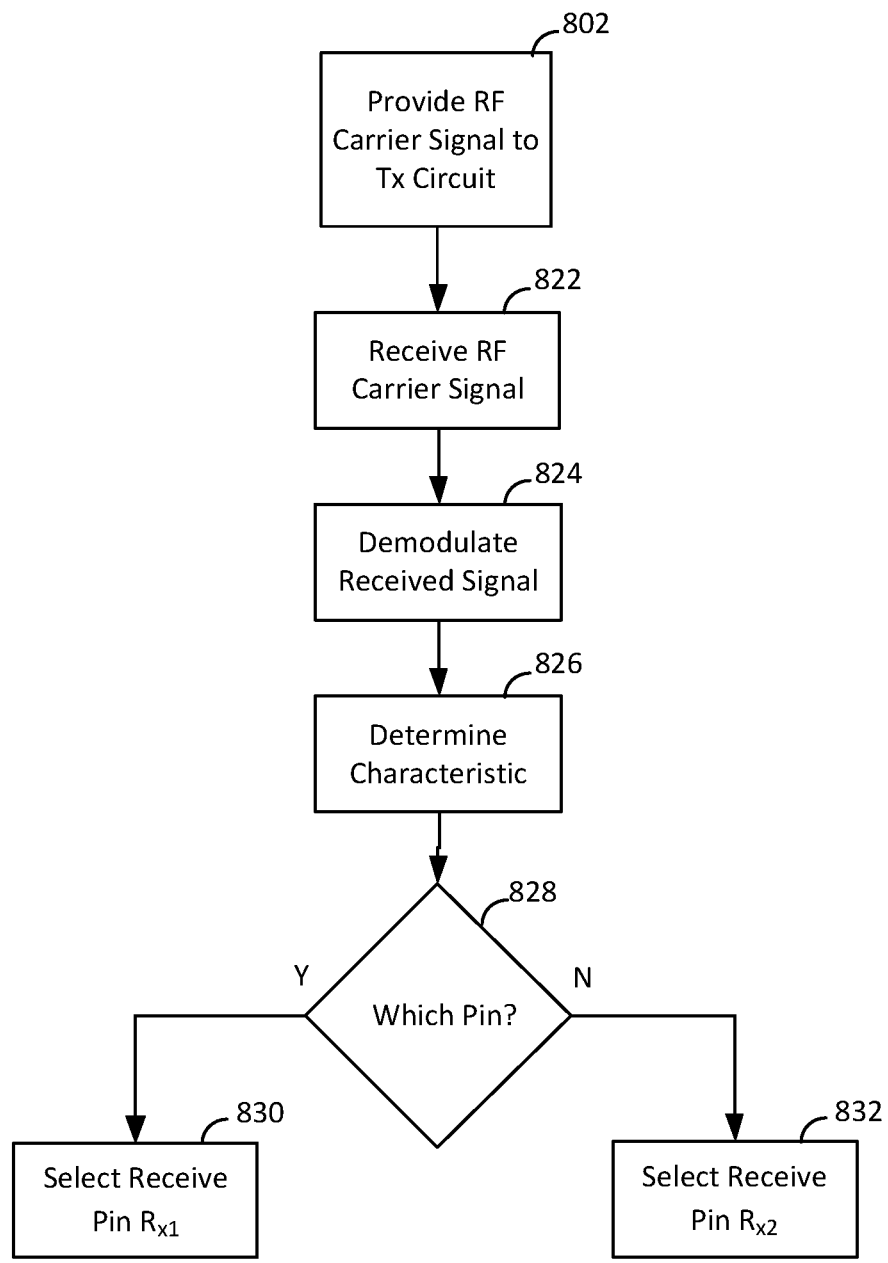
FIG. 8 depicts a non-limiting flow diagram illustrating exemplary steps for improving receive performance of a wireless communication device in accordance with some embodiments of the present disclosure.

FIG. 8 depicts a non-limiting flow diagram illustrating exemplary steps for modifying a receive path for a wireless communication device in accordance with some embodiments of the present disclosure.

At step 802, transaction chip 114 provides a wireless carrier signal to transmit circuit of NFC circuit 500 based on processing unit 124 executing receive control instructions 173. In some embodiments, the transmit circuit of payment terminal 20 may be coupled to the transponder antenna 440. After the wireless carrier signal has been provided to the transmit circuit, processing may continue to step 822.

At step 822, a modulated version of the wireless carrier signal may be received based on load modulation produced by a contactless payment device 10. The inductively coupled load enables payment terminal 20 to communicate data with contactless payment device 10 via transponder antenna 440, based also on the inductive loading of auxiliary antenna 460. When the wireless carrier signal transmitted by the transponder antenna 440 is modulated by a payment device, transaction chip 114 may receive a received signal that represents an inductively coupled a load for the wireless carrier signal based on auxiliary antenna 460 and the changing load of the contactless payment device 10. After the received signal is received, processing may continue to step 824.

At step 824, transaction chip 114 may demodulate the received signal based on the processing unit 124 executing receive measurement instructions 174. Processing circuitry of transaction chip 114, such as processing unit 124 may receive and demodulate the received signal and provide data for use by other resources of payment terminal 20 based on the demodulated received signal. After the processing unit 124 demodulates the received signal based on receive measurement instructions 174, processing may continue to step 826.

At step 826, transaction chip 114 may determine a characteristic of the payment terminal and/or the inductively coupled signal (e.g., an operating mode, a determined characteristic, and/or a measured characteristic) based on the processing unit 124 executing receive measurement instructions 174. Receive measurement instructions 174 may include instructions for determining the characteristic (i.e., applied by contactless payment device 10), such as by identifying a modulation procedure or measuring an inductively coupled load represented by the received signal from transponder antenna 440. After transaction chip 114 determines the characteristic, processing may continue to step 828.

At step 828, transaction chip 114 may compare the determined characteristic determined at step 826 with a pre-defined criteria (e.g., a threshold) based on the processing unit 124 executing receive measurement instruction. In some embodiments, receive measurement instructions 174 may include the criteria information and may be stored in memory 126 of transaction chip 114. If transaction chip 114 determines that the determined characteristic meets the criteria (e.g., is greater than a threshold) processing may continue to step 830, at which transaction chip 114 may select a receive pin $R_{x1}$ based on the processing unit 124 executing receive control instructions 173. If transaction chip 114 determines that the determined characteristic does not meet the criteria (e.g., is less than the threshold), processing may continue to step 832, at which transaction chip 114 may select a receive pin coupled to an EMI filter of EMC circuit 420 based the processing unit 124 executing receive control instructions 173.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A payment terminal for wirelessly communicating payment information with a payment device inductively coupled to the payment terminal, the payment terminal comprising:
    a transponder antenna, wherein the transponder antenna transmits (1) a modulated wireless signal during transmit events for which the payment terminal transmits data to the payment device and (2) a wireless carrier signal during receive events for which the payment terminal receives data from the payment device;
    a transmit circuit coupled to the transponder antenna, wherein the transmit circuit comprises a transmit load for the transponder antenna, and wherein the modulated wireless signal and the wireless carrier signal are provided to the transponder antenna through the transmit circuit;
    a receive circuit coupled to the transponder antenna, wherein the receive circuit is configured to output a received signal representing an inductively coupled load for the wireless carrier signal;
    an auxiliary antenna, wherein the auxiliary antenna is positioned at a fixed location and in a fixed orientation relative to the transponder antenna, and wherein the auxiliary antenna only receives the wireless carrier signal through inductive coupling with the transponder antenna;
    a processing element configured to execute control instructions stored in a memory to perform steps comprising:
        disabling, based on the transponder antenna transmitting the modulated wireless signal, an inductive coupling between the transponder antenna and the auxiliary antenna,
        enabling, based on a detection of one of the receive events by the processing element, the inductive coupling between the transponder antenna and the auxiliary antenna,
        demodulating, during the one of the receive events, the received signal, and
        controlling the inductive coupling such that the inductive coupling is disabled if the payment terminal is transmitting data via the transponder antenna and the inductive coupling is enabled if the payment terminal is receiving data via the transponder antenna while the payment device is within range for communication with the transponder antenna,
    wherein the inductively coupled load represented by the received signal includes inductive loads of the auxiliary antenna and the payment device.

2. The payment terminal of claim 1, wherein the demodulating of the received signal is based on an amplitude of the received signal.

3. The payment terminal of claim 1, wherein the auxiliary antenna comprises at least two turns.

4. A wireless communication device comprising:
    a primary antenna configured to transmit (1) a wireless carrier signal during a receive event for which the wireless communication device receives data from a second device inductively coupled to the primary antenna and (2) a wireless modulated signal during a transmit event for which the wireless communication device transmits data to the second device inductively coupled to the primary antenna;
    an auxiliary antenna; and
    a processing element configured to execute instructions stored in a memory to cause the wireless communication device to perform steps comprising:
        detecting at least one of the transmit event or the receive event;
        disabling, during the transmit event, an inductive coupling between the primary antenna and the auxiliary antenna,
        enabling, during the receive event, the inductive coupling between the primary antenna and the auxiliary antenna,
        demodulating, during the receive event, a received signal from the primary antenna,
        controlling the inductive coupling such that the inductive coupling is disabled if the wireless communication device is transmitting data via the primary antenna and the inductive coupling is enabled if the wireless communication device is receiving data via the primary antenna while the second device is within range for communication with the primary antenna,
    wherein an inductively coupled load represented by the received signal includes an inductive load of the auxiliary antenna, and wherein at least one of the disabling or the enabling is based on the detecting.

5. The wireless communication device of claim 4, further comprising:
    a transmit circuit coupled to the primary antenna,
        wherein the processing element is coupled to the primary antenna via the transmit circuit, and
        wherein the transmit circuit comprises a transmit load for the primary antenna.

6. The wireless communication device of claim 4, wherein the auxiliary antenna only receives the wireless carrier signal through inductive coupling with the primary antenna.

7. The wireless communication device of claim 4, wherein the auxiliary antenna is positioned at a fixed location and orientation relative to the primary antenna.

8. The wireless communication device of claim 4, further comprising:
    a switching circuit coupled to the auxiliary antenna, and
    wherein the switching circuit disables the auxiliary antenna in response to the disabling and enables the auxiliary antenna in response to the enabling.

9. The wireless communication device of claim 8, further comprising:
    an auxiliary load circuit coupled to the auxiliary antenna.

10. The wireless communication device of claim 4, wherein the processing element is further configured to execute the instructions to cause the wireless communication device to perform steps comprising:
    demodulating the received signal based on an amplitude of the received signal.

11. The wireless communication device of claim 4, wherein the auxiliary antenna comprises at least two turns.

12. A method comprising:
transmitting, via a primary antenna of a wireless communication device, (1) a wireless carrier signal during a receive event for which the wireless communication device receives data from a second device inductively coupled to the primary antenna and (2) a wireless modulated signal during a transmit event for which the wireless communication device transmits data to the second device inductively coupled to the wireless communication device;
detecting at least one of the transmit event or the receive event;
disabling, during the transmit event, an inductive coupling between the primary antenna and an auxiliary antenna;
enabling, during the receive event, the inductive coupling between the primary antenna and the auxiliary antenna; and
demodulating a received signal from the primary antenna during the receive event; and
controlling the inductive coupling such that the inductive coupling is disabled if the wireless communication device is transmitting data via the primary antenna and the inductive coupling is enabled if the wireless communication device is receiving data via the primary antenna while the second device is within range for communication with the primary antenna,
wherein an inductively coupled load represented by the received signal includes an inductive load of the auxiliary antenna, and wherein at least one of the disabling or the enabling is based on the detecting.

13. The method of claim 12, further comprising:
providing the received signal to a processing element via a receive circuit.

14. The method of claim 12, wherein transmitting the wireless carrier signal during the receive event and the wireless modulated signal during the transmit event comprises transmitting the wireless carrier signal and the wireless modulated signal based on a transmit load coupled to the primary antenna.

15. The method of claim 12, further comprising:
receiving, at the auxiliary antenna, the wireless carrier signal,
wherein the auxiliary antenna only receives the wireless carrier signal through inductive coupling with the primary antenna.

16. The method of claim 12, wherein the auxiliary antenna is positioned at a fixed location and orientation relative to the primary antenna.

17. The method of claim 12, wherein the enabling comprises closing a switching circuit, and
wherein the disabling comprises opening the switching circuit.

18. The method of claim 17, wherein closing the switching circuit comprises coupling an auxiliary load circuit to two terminals of the auxiliary antenna.

19. The method of claim 12, wherein the received signal is demodulated based on an amplitude of the received signal.

20. The method of claim 12, wherein the auxiliary antenna comprises at least two turns.

* * * * *